United States Patent
Zhu

(10) Patent No.: US 10,117,206 B2
(45) Date of Patent: Oct. 30, 2018

(54) METHOD FOR SYNCHRONIZING CONTENT AMONG TERMINALS AND TERMINALS

(71) Applicant: Huawei Device (Dongguan) Co., Ltd., Dongguan (CN)

(72) Inventor: Yu Zhu, Shenzhen (CN)

(73) Assignee: HUAWEI DEVICE (DONGGUAN) CO., LTD., Dongguan (CN)

(*) Notice: Subject to any disclaimer, the term of this patent is extended or adjusted under 35 U.S.C. 154(b) by 90 days.

(21) Appl. No.: 14/973,023

(22) Filed: Dec. 17, 2015

(65) Prior Publication Data

US 2016/0105859 A1    Apr. 14, 2016

Related U.S. Application Data

(63) Continuation of application No. PCT/CN2014/073534, filed on Mar. 17, 2014.

(51) Int. Cl.
*H04H 20/71* (2008.01)
*H04W 56/00* (2009.01)
(Continued)

(52) U.S. Cl.
CPC .......... *H04W 56/003* (2013.01); *H04W 4/80* (2018.02); *H04W 8/005* (2013.01); *H04W 76/10* (2018.02); *H04W 76/11* (2018.02); *H04W 76/14* (2018.02)

(58) Field of Classification Search
USPC ............... 370/312, 329, 338, 393, 412, 445
See application file for complete search history.

(56) References Cited

U.S. PATENT DOCUMENTS 9,641,488 B2 * 5/2017 Mityagin ............ H04L 63/0428
2004/0006591 A1 1/2004 Matsui et al.
(Continued)

FOREIGN PATENT DOCUMENTS

CN    1954316 A    4/2007
CN    101098339 A    1/2008
(Continued)

OTHER PUBLICATIONS

"ContentSync:1 Service Template Version 1.01," Jul. 14, 2009, 111 pages.
(Continued)

*Primary Examiner* — Phuongchau Ba Nguyen
(74) *Attorney, Agent, or Firm* — Conley Rose, P.C.

(57) ABSTRACT

A method for synchronizing content among terminals and terminals. The method includes determining, by a first terminal, content for sharing of the first terminal; when the first terminal discovers a second terminal, establishing, by the first terminal, a connection to the second terminal using a short-range wireless communications technology, where the second terminal belongs to a same synchronization group as the first terminal, and can establish a connection to the first terminal using a short-range wireless communications technology, and terminals that belong to a same synchronization group can synchronize content for sharing; and synchronizing, by the first terminal, the content for sharing of the first terminal and content for sharing of the second terminal using the connection established to the second terminal. The method is applicable to the field of communications technologies.

11 Claims, 19 Drawing Sheets

(51) Int. Cl.
  *H04W 76/14* (2018.01)
  *H04W 76/10* (2018.01)
  *H04W 76/11* (2018.01)
  *H04W 4/80* (2018.01)
  *H04W 8/00* (2009.01)

(56) References Cited

U.S. PATENT DOCUMENTS

| | | |
|---|---|---|
| 2008/0005188 A1 | 1/2008 | Li et al. |
| 2008/0005358 A1 | 1/2008 | Kwon et al. |
| 2008/0222212 A1 | 9/2008 | Prasad et al. |
| 2008/0288578 A1 | 11/2008 | Silfverberg |
| 2010/0203833 A1 | 8/2010 | Dorsey |
| 2012/0177067 A1 | 7/2012 | Cho et al. |
| 2012/0271910 A1 | 10/2012 | Huh |
| 2013/0011025 A1 | 1/2013 | Liu et al. |
| 2014/0025847 A1 | 1/2014 | Choi et al. |
| 2014/0324993 A1* | 10/2014 | Li ................ H04L 12/1818 709/206 |

FOREIGN PATENT DOCUMENTS

| | | |
|---|---|---|
| CN | 101517957 A | 8/2009 |
| CN | 102349073 A | 2/2012 |
| CN | 102483736 A | 5/2012 |
| CN | 102595228 A | 7/2012 |
| CN | 103491183 A | 1/2014 |
| CN | 103561299 A | 2/2014 |
| CN | 103581285 A | 2/2014 |

OTHER PUBLICATIONS

"Part 1-1: Architectures and Protocols, An Industry Guide for Building Interoperable Platforms, Devices, and Applications" DLNA Guidelines, Mar. 2014, 986 pages.
Partial English Translation and Abstract of Chinese Patent Application No. CN101517957, Apr. 7, 2016, 5 pages.
Partial English Translation and Abstract of Chinese Patent Application No. CN103561299, Oct. 12, 2015, 22 pages.
Foreign Communication From A Counterpart Application, PCT Application No. PCT/CN2014/073534, English Translation of International Search Report dated Dec. 24, 2014, 2 pages.
Koskela, T., et al., "P2P Group Management Systems: A Conceptual Analysis," ACM Comput. Surv., 2, Article 20, Feb. 2013, 25 pages.
Foreign Communication From A Counterpart Application, European Application No. 14886092.7, Extended European Search Report dated Apr. 26, 2016, 8 pages.

* cited by examiner

METHOD FOR SYNCHRONIZING CONTENT AMONG TERMINALS AND TERMINALS

CROSS-REFERENCE TO RELATED APPLICATIONS

This application is a continuation of International Application No. PCT/CN2014/073534, filed on Mar. 17, 2014, which is hereby incorporated by reference in its entirety.

TECHNICAL FIELD

The present disclosure relates to the field of communications technologies, and in particular, to a method for synchronizing content among terminals and terminals.

BACKGROUND

As photography and video recording performance of mobile terminals in the prior art is improved significantly and photo and video sharing is supported anytime and anywhere, users take photos and record videos more frequently using mobile terminals such as smartphones, tablet computers, or digital cameras with a network connecting function, and share photos and videos with friends instantly using wireless networks and social applications or save photos and videos instantly using network storage services.

At present, in the industry there are some solutions in which content in a mobile terminal is shared using a short-range wireless communications technology, for example, Bluetooth (BT), or Digital Living Network Alliance (DLNA).

A Bluetooth technology is widely applied in file sharing among terminals. For example, when a user shares a file with another user, the user first needs to enable the Bluetooth to discover devices nearby and manually select, from the discovered devices nearby, a device of the other user to establish a connection to the device, and then the user also manually selects a file that needs to be shared.

DLNA is a media sharing technology based on the Internet Protocol (IP) and can be run on physical connections such as the Ethernet, Wi-Fi, and power lines. The DLNA defines device types such as a digital media server (DMS), a digital media renderer (DMR), a digital media player (DMP), and a digital media controller (DMC). A DMS can discover a DMR device nearby, and a user can select media at a DMS end and manually select a DMR to which the media needs to be pushed. A device DMP can also discover a DMS in a network, and a user can browse and play, in the DMP, a media file shared in the discovered DMS device. Compared with a Bluetooth technology, because of using a Wi-Fi wireless transmission technology, the DLNA has a higher speed and can support sharing among multiple devices.

However, regardless of the Bluetooth technology or the DLNA technology, if a user wants to synchronize and share a media file in another device, the user needs to perform a large number of manual operations, such as an operation of selecting a device and a media file for synchronization and sharing.

SUMMARY

Embodiments of the present disclosure provide a method for synchronizing content among terminals, so as to reduce manual operations of a user as much as possible and conveniently synchronize content among terminals.

To achieve the foregoing objective, the following technical solutions are used in the embodiments of the present disclosure.

According to a first aspect, the present disclosure provides a method for synchronizing content among terminals, where the method includes determining, by a first terminal, content for sharing of the first terminal; when the first terminal discovers a second terminal, establishing, by the first terminal, a connection to the second terminal using a short-range wireless communications technology, where the second terminal belongs to a same synchronization group as the first terminal, and can establish a connection to the first terminal using a short-range wireless communications technology, and terminals that belong to a same synchronization group can synchronize content for sharing; and synchronizing, by the first terminal, the content for sharing of the first terminal and content for sharing of the second terminal using the connection established to the second terminal.

With reference to the first aspect, in a first possible implementation manner, before the first terminal discovers a second terminal, the method further includes sending, by the first terminal, a synchronization group create message to the second terminal, where the synchronization group create message carries an identifier of the first terminal and an identifier of the synchronization group, and the synchronization group create message is used for requesting the second terminal to join the synchronization group; receiving, by the first terminal, a synchronization group join message returned by the second terminal that agrees to join the synchronization group, where the synchronization group join message includes an identifier of the second terminal and the identifier of the synchronization group; and storing, by the first terminal, the identifier of the second terminal in group member information, where a process in which the first terminal discovers the second terminal includes discovering, by the first terminal, the second terminal according to the group member information; and the establishing, by the first terminal, a connection to the second terminal using a short-range wireless communications technology includes establishing, by the first terminal, the connection to the second terminal according to the identifier of the second terminal using the short-range wireless communications technology.

With reference to the first aspect, in a second possible implementation manner, before the first terminal discovers a second terminal, the method further includes receiving, by the first terminal, a synchronization group create message sent by a creating terminal, where the synchronization group create message carries an identifier of the creating terminal and an identifier of the synchronization group, and the synchronization group create message is used for requesting the first terminal to join the synchronization group; agreeing, by the first terminal, to join the synchronization group; sending, by the first terminal, a synchronization group join message to the creating terminal, where the synchronization group join message includes an identifier of the first terminal and the identifier of the synchronization group; and storing, by the first terminal, the identifier of the creating terminal in group member information, where a process in which the first terminal discovers the second terminal includes discovering, by the first terminal, the second terminal according to the group member information; and the establishing, by the first terminal, a connection to the second terminal using a short-range wireless communications technology includes establishing, by the first terminal, the connection to the second terminal according to an identifier of the second terminal using the short-range wireless communications technology.

With reference to the second possible implementation manner, in a third possible implementation manner, after the agreeing, by the first terminal, to join the synchronization group, the method further includes receiving, by the first terminal, a synchronization group join message sent by a third terminal that agrees to join the synchronization group, where the synchronization group join message sent by the third terminal includes an identifier of the third terminal and the identifier of the synchronization group; and storing, by the first terminal, the identifier of the third terminal in the group member information.

With reference to the first possible implementation manner, in a fourth possible implementation manner, the sending, by the first terminal, a synchronization group create message to the second terminal includes multicasting, by the first terminal, the synchronization group create message to the second terminal in a local area network; and the receiving, by the first terminal, a synchronization group join message returned by the second terminal that agrees to join the synchronization group includes receiving, by the first terminal, the synchronization group join message multicasted in the local area network by the second terminal that agrees to join the synchronization group.

With reference to the first possible implementation manner, in a fifth possible implementation manner, the sending, by the first terminal, a synchronization group create message to the second terminal includes sending, by the first terminal, the synchronization group create message to a message server, such that the message server forwards the synchronization group create message to the second terminal; and the receiving, by the first terminal, a synchronization group join message returned by the second terminal that agrees to join the synchronization group, includes receiving, by the first terminal, the synchronization group join message that is sent by the second terminal that agrees to join the synchronization group and is forwarded by the message server.

With reference to the first possible implementation manner, in a sixth possible implementation manner, the synchronization group create message further carries a shared folder name, and before the first terminal discovers a second terminal, the method further includes creating, by the first terminal, a shared folder corresponding to the shared folder name; and storing, by the first terminal, description information of the content for sharing in the shared folder, where the synchronizing, by the first terminal, the content for sharing of the first terminal and content for sharing of the second terminal using the connection established to the second terminal includes acquiring, by the first terminal, using the connection established to the second terminal and according to the description information of the content for sharing stored in the shared folder of the first terminal and description information of the content for sharing stored in a shared folder of the second terminal, corresponding content for sharing, and synchronizing the content for sharing with the second terminal.

With reference to the second possible implementation manner, in a seventh possible implementation manner, the synchronization group create message further carries a shared folder name, and after the receiving, by the first terminal, a synchronization group create message sent by a creating terminal and before the first terminal discovers a second terminal, the method further includes creating, by the first terminal, a shared folder corresponding to the shared folder name; and storing, by the first terminal, description information of the content for sharing in the shared folder, where the synchronizing, by the first terminal, the content for sharing of the first terminal and content for sharing of the second terminal using the connection established to the second terminal includes acquiring, by the first terminal, using the connection established to the second terminal and according to the description information of the content for sharing stored in the shared folder of the first terminal and description information of the content for sharing stored in a shared folder of the second terminal, corresponding content for sharing, and synchronizing the content for sharing with the second terminal.

With reference to the first aspect or the first possible implementation manner to the fifth possible implementation manner, in an eighth possible implementation manner, the synchronizing, by the first terminal, the content for sharing of the first terminal and content for sharing of the second terminal using the connection established to the second terminal includes acquiring, by the first terminal, description information, on a central node, of the content for sharing of the second terminal, where the central node belongs to the synchronization group; acquiring, by the first terminal according to the description information, on the central node, of the content for sharing of the second terminal and description information of the content for sharing of the first terminal, corresponding content for sharing, and synchronizing the content for sharing with the second terminal.

With reference to the first aspect or the first possible implementation manner to the eighth possible implementation manner, in a ninth possible implementation manner, before the synchronizing, by the first terminal, the content for sharing of the first terminal and content for sharing of the second terminal using the connection established to the second terminal, the method further includes at least one of the following: authenticating, by the first terminal, the second terminal, and succeeding in the authentication; and determining, by the first terminal, that a current moment falls within a preset synchronization period of time.

According to a second aspect, the present disclosure provides a method for synchronizing content among terminals, where the method includes determining, by a second terminal, content for sharing of the second terminal; when the second terminal is discovered by a first terminal, establishing, by the second terminal, a connection to the first terminal using a short-range wireless communications technology, where the second terminal belongs to a same synchronization group as the first terminal, and can establish a connection to the first terminal using a short-range wireless communications technology, and terminals that belong to a same synchronization group can synchronize content for sharing; and synchronizing, by the second terminal, the content for sharing of the second terminal and content for sharing of the first terminal using the connection established to the first terminal.

With reference to the second aspect, in a first possible implementation manner, before the second terminal is discovered by a first terminal, the method further includes sending, by the second terminal, a synchronization group create message to the first terminal, where the synchronization group create message carries an identifier of the second terminal and an identifier of the synchronization group, and the synchronization group create message is used for requesting the first terminal to join the synchronization group; receiving, by the second terminal, a synchronization group join message returned by the first terminal that agrees to join the synchronization group, where the synchronization group join message includes an identifier of the first terminal and the identifier of the synchronization group; and storing, by the second terminal, the identifier of the first terminal in group member information, where the establishing, by the second terminal, a connection to the first terminal using a short-range wireless communications technology includes establishing, by the second terminal according to the identifier of the first terminal, the connection to the first terminal using the short-range wireless communications technology.

With reference to the second aspect, in a second possible implementation manner, before the second terminal is discovered by a first terminal, the method further includes receiving, by the second terminal, a synchronization group create message sent by a creating terminal, where the synchronization group create message carries an identifier of the creating terminal and an identifier of the synchronization group, and the synchronization group create message is used for requesting the second terminal to join the synchronization group; agreeing, by the second terminal, to join the synchronization group; sending, by the second terminal, a synchronization group join message, where the synchronization group join message includes an identifier of the second terminal and the identifier of the synchronization group; and storing, by the second terminal, the identifier of the creating terminal in group member information.

With reference to the first possible implementation manner, in a third possible implementation manner, the synchronization group create message further carries a shared folder name, and before the second terminal is discovered by a first terminal, the method further includes creating, by the second terminal, a shared folder corresponding to the shared folder name; and storing, by the second terminal, description information of the content for sharing in the shared folder, where the synchronizing, by the second terminal, the content for sharing of the second terminal and content for sharing of the first terminal using the connection established to the first terminal includes acquiring, by the second terminal using the connection established to the first terminal and according to description information of the content for sharing stored in a shared folder of the first terminal and the description information of the content for sharing stored in the shared folder of the second terminal, corresponding content for sharing, and synchronizing the content for sharing with the first terminal.

With reference to the second possible implementation manner, in a fourth possible implementation manner, the synchronization group create message further carries a shared folder name, and before the second terminal is discovered by a first terminal, the method further includes creating, by the second terminal, a shared folder corresponding to the shared folder name; and storing, by the second terminal, description information of the content for sharing in the shared folder, where the synchronizing, by the second terminal, the content for sharing of the second terminal and content for sharing of the first terminal using the connection established to the first terminal includes acquiring, by the second terminal using the connection established to the first terminal and according to description information of the content for sharing stored in a shared folder of the first terminal and the description information of the content for sharing stored in the shared folder of the second terminal, corresponding content for sharing, and synchronizing the content for sharing with the first terminal.

With reference to the second aspect or the first possible implementation manner to the second possible implementation manner, in a fifth possible implementation manner, the synchronizing, by the second terminal, the content for sharing of the second terminal and content for sharing of the first terminal using the connection established to the first terminal includes acquiring, by the second terminal, description information, on a central node, of the content for sharing of the first terminal, where the central node belongs to the synchronization group; acquiring, by the second terminal according to the description information, on the central node, of the content for sharing of the first terminal and description information of the content for sharing of the second terminal, corresponding content for sharing, and synchronizing the content for sharing with the first terminal.

With reference to the second aspect or the first possible implementation manner to the fifth possible implementation manner, in a sixth possible implementation manner, before the synchronizing, by the second terminal, the content for sharing of the second terminal and content for sharing of the first terminal using the connection established to the first terminal, the method further includes at least one of the following: authenticating, by the second terminal, the first terminal, and succeeding in the authentication; and determining, by the second terminal, that a current moment falls within a preset synchronization period of time.

According to a third aspect, the present disclosure provides a first terminal, where the first terminal includes a first determining unit, a first connection unit, and a first synchronization unit, where the first determining unit is configured to determine content for sharing of the first terminal; the first connection unit is configured to, when the first terminal discovers a second terminal, establish a connection to the second terminal using a short-range wireless communications technology, where the second terminal belongs to a same synchronization group as the first terminal, and can establish a connection to the first terminal using a short-range wireless communications technology, and terminals that belong to a same synchronization group can synchronize content for sharing; and the first synchronization unit is configured to synchronize the content for sharing of the first terminal and content for sharing of the second terminal using the connection established to the second terminal.

With reference to the third aspect, in a first possible implementation manner, the first terminal further includes a first sending unit, a first receiving unit, a first storage unit, and a first discovering unit, where the first sending unit is configured to send a synchronization group create message to the second terminal, where the synchronization group create message carries an identifier of the first terminal and an identifier of the synchronization group, and the synchronization group create message is used for requesting the second terminal to join the synchronization group; the first receiving unit is configured to receive a synchronization group join message returned by the second terminal that agrees to join the synchronization group, where the synchronization group join message includes an identifier of the second terminal and the identifier of the synchronization group; the first storage unit is configured to store the identifier of the second terminal in group member information; the first discovering unit is configured to discover the second terminal according to the group member information; and the first connection unit is configured to establish the connection to the second terminal according to the identifier of the second terminal using the short-range wireless communications technology.

With reference to the third aspect or the first possible implementation manner, in a second possible implementation manner, the first terminal further includes a second receiving unit, a first confirming unit, a second sending unit, a second storage unit, and a second discovering unit, where the second receiving unit is further configured to receive a synchronization group create message sent by a creating terminal, where the synchronization group create message carries an identifier of the creating terminal and the identifier of the synchronization group, and the synchronization group create message is used for requesting the first terminal to join the synchronization group; the first confirming unit is configured to agree to join the synchronization group; the second sending unit is configured to send a synchronization group join message to the creating terminal, where the synchronization group join message includes an identifier of the first terminal and the identifier of the synchronization group; the second storage unit is configured to store the identifier of the creating terminal in group member information; the second discovering unit is configured to discover the second terminal according to the group member information; and the first connection unit is configured to establish the connection to the second terminal according to the identifier of the second terminal using the short-range wireless communications technology.

With reference to the second possible implementation manner, in a third possible implementation manner, the second receiving unit is further configured to receive a synchronization group join message sent by a third terminal that agrees to join the synchronization group, where the synchronization group join message sent by the third terminal includes an identifier of the third terminal and the identifier of the synchronization group; and the second storage unit is further configured to store the identifier of the third terminal in the group member information.

With reference to the first possible implementation manner, in a fourth possible implementation manner, the first sending unit is configured to multicast the synchronization group create message to the second terminal in a local area network; and the first receiving unit is configured to receive the synchronization group join message multicasted in the local area network by the second terminal that agrees to join the synchronization group.

With reference to the first possible implementation manner, in a fifth possible implementation manner, the first sending unit is configured to send the synchronization group create message to a message server, such that the message server forwards the synchronization group create message to the second terminal; and the first receiving unit is configured to receive the synchronization group join message that is sent by the second terminal that agrees to join the synchronization group and is forwarded by the message server.

With reference to the first possible implementation manner, in a sixth possible implementation manner, the first sending unit is configured to send the synchronization group create message to the second terminal, where the synchronization group create message carries the identifier of the first terminal, the identifier of the synchronization group, and a shared folder name, and the synchronization group create message is used for requesting the second terminal to join the synchronization group; the first terminal further includes a first creating unit and a third storage unit, where the first creating unit is configured to create a shared folder corresponding to the shared folder name; and the third storage unit is configured to store description information of the content for sharing in the shared folder; and the first synchronization unit is configured to acquire, using the connection established to the second terminal and according to the description information of the content for sharing stored in the shared folder of the first terminal and description information of the content for sharing stored in a shared folder of the second terminal, corresponding content for sharing, and synchronize the content for sharing with the second terminal.

With reference to the second possible implementation manner, in a seventh possible implementation manner, the second receiving unit is configured to receive the synchronization group create message sent by the creating terminal, where the synchronization group create message carries the identifier of the first terminal, the identifier of the synchronization group, and a shared folder name, and the synchronization group create message is used for requesting the first terminal to join the synchronization group; the first terminal further includes a second creating unit and a fourth storage unit, where the second creating unit is configured to create a shared folder corresponding to the shared folder name; and the fourth storage unit is configured to store description information of the content for sharing in the shared folder; and the first synchronization unit is configured to acquire, using the connection established to the second terminal and according to the description information of the content for sharing stored in the shared folder of the first terminal and description information of the content for sharing stored in a shared folder of the second terminal, corresponding content for sharing, and synchronize the content for sharing with the second terminal.

With reference to the third aspect or the first possible implementation manner to the fifth possible implementation manner, in an eighth possible implementation manner, the first synchronization unit is configured to acquire description information, on a central node, of the content for sharing of the second terminal, where the central node belongs to the synchronization group; and acquire, according to the description information, on the central node, of the content for sharing of the second terminal and description information of the content for sharing of the first terminal, corresponding content for sharing, and synchronize the content for sharing with the second terminal.

With reference to the third aspect or the first possible implementation manner to the eighth possible implementation manner, in a ninth possible implementation manner, the first terminal further includes at least one of the following units: a first authenticating unit and the first determining unit, where the first authenticating unit is configured to authenticate the second terminal; and the first determining unit is configured to determine whether a current moment falls within a preset synchronization period of time.

According to a fourth aspect, the present disclosure provides a second terminal, where the second terminal includes a second determining unit, a second connection unit, and a second synchronization unit, where the second determining unit is configured to determine content for sharing of the second terminal; the second connection unit is configured to, when the second terminal is discovered by a first terminal, establish a connection to the first terminal using a short-range wireless communications technology, where the second terminal belongs to a same synchronization group as the first terminal, and can establish a connection to the first terminal using a short-range wireless communications technology, and terminals that belong to a same synchronization group can synchronize content for sharing; and the second synchronization unit is configured to synchronize the content for sharing of the second terminal and content for sharing of the first terminal using the connection established to the first terminal.

With reference to the fourth aspect, in a first possible implementation manner, the second terminal further includes a third sending unit, a third receiving unit, and a fifth storage unit, where the third sending unit is configured to send a synchronization group create message to the first terminal, where the synchronization group create message carries an identifier of the second terminal and an identifier of the synchronization group, and the synchronization group create message is used for requesting the first terminal to join the synchronization group; the third receiving unit is configured to receive a synchronization group join message returned by the first terminal that agrees to join the synchronization group, where the synchronization group join message includes an identifier of the first terminal and the identifier of the synchronization group; the fifth storage unit is configured to store the identifier of the first terminal in group member information; and the second connection unit is configured to establish the connection to the first terminal according to the identifier of the first terminal using the short-range wireless communications technology.

With reference to the fourth aspect or the first possible implementation manner, in a second possible implementation manner, the second terminal further includes a fourth receiving unit, a second confirming unit, a fourth sending unit, and a sixth storage unit, where the fourth receiving unit is configured to receive a synchronization group create message sent by a creating terminal, where the synchronization group create message carries an identifier of the creating terminal and the identifier of the synchronization group, and the synchronization group create message is used for requesting the second terminal to join the synchronization group; the second confirming unit is configured to agree to join the synchronization group; the fourth sending unit is configured to send a synchronization group join message, where the synchronization group join message includes the identifier of the second terminal and the identifier of the synchronization group; and the sixth storage unit is configured to store the identifier of the creating terminal in group member information.

With reference to the first possible implementation manner, in a third possible implementation manner, the third sending unit is configured to send the synchronization group create message to the first terminal, where the synchronization group create message carries the identifier of the first terminal, the identifier of the synchronization group, and a shared folder name, and the synchronization group create message is used for requesting the first terminal to join the synchronization group; the second terminal further includes a third creating unit and a seventh storage unit, where the third creating unit is configured to create a shared folder corresponding to the shared folder name; and the seventh storage unit is configured to store description information of the content for sharing in the shared folder; and the second synchronization unit is configured to acquire, using the connection established to the first terminal and according to description information of the content for sharing stored in a shared folder of the first terminal and the description information of the content for sharing stored in the shared folder of the second terminal, corresponding content for sharing, and synchronize the content for sharing with the first terminal.

With reference to the second possible implementation manner, in a fourth possible implementation manner, the fourth receiving unit is configured to receive the synchronization group create message sent by the creating terminal, where the synchronization group create message carries the identifier of the creating terminal, the identifier of the synchronization group, and a shared folder name, and the synchronization group create message is used for requesting the second terminal to join the synchronization group; the second terminal further includes a fourth creating unit and an eighth storage unit, where the fourth creating unit is configured to create a shared folder corresponding to the shared folder name; and the eighth storage unit is configured to store description information of the content for sharing in the shared folder; and the second synchronization unit is configured to acquire, using the connection established to the first terminal and according to description information of the content for sharing stored in a shared folder of the first terminal and the description information of the content for sharing stored in the shared folder of the second terminal, corresponding content for sharing, and synchronize the content for sharing with the first terminal.

With reference to the fourth aspect or the first possible implementation manner to the second possible implementation manner, in a fifth possible implementation manner, the second synchronization unit is configured to acquire description information, on a central node, of the content for sharing of the first terminal, where the central node belongs to the synchronization group; and acquire, according to the description information, on the central node, of the content for sharing of the first terminal and description information of the content for sharing of the second terminal, corresponding content for sharing, and synchronize the content for sharing with the first terminal.

With reference to the fourth aspect or the first possible implementation manner to the fifth possible implementation manner, in a sixth possible implementation manner, the second terminal further includes at least one of the following units: a second authenticating unit and a second determining unit, where the second authenticating unit is configured to authenticate the first terminal; and the second determining unit is configured to determine whether a current moment falls within a preset synchronization period of time.

According to a fifth aspect, the present disclosure provides a first terminal, where the first terminal includes a processor, a memory, and a transceiver, where the processor is configured to determine content for sharing of the first terminal and store the content for sharing of the first terminal in the memory, and when the first terminal discovers a second terminal, invoke the transceiver to establish, using a short-range wireless communications technology, a connection to the second terminal, where the second terminal belongs to a same synchronization group as the first terminal, and can establish a connection to the first terminal using a short-range wireless communications technology, and terminals that belong to a same synchronization group can synchronize content for sharing; and the processor is further configured to invoke the transceiver to synchronize, using the connection established to the second terminal, the content for sharing of the first terminal and content for sharing of the second terminal.

With reference to the fifth aspect, in a first possible implementation manner, the processor is further configured to invoke the transceiver to send a synchronization group create message to the second terminal, where the synchronization group create message carries an identifier of the first terminal and an identifier of the synchronization group, and the synchronization group create message is used for requesting the second terminal to join the synchronization group; and receive a synchronization group join message returned by the second terminal that agrees to join the synchronization group, where the synchronization group join message includes an identifier of the second terminal and the identifier of the synchronization group; the processor is further configured to store group member information including the identifier of the first terminal in the memory;

the processor is further configured to invoke the group member information in the memory and invoke the transceiver to discover the second terminal; and the processor is configured to invoke the transceiver to establish, according to the identifier of the second terminal using the short-range wireless communications technology, the connection to the second terminal.

With reference to the fifth aspect or the first possible implementation manner, in a second possible implementation manner, the processor is further configured to invoke the transceiver to receive a synchronization group create message sent by a creating terminal, where the synchronization group create message carries an identifier of the creating terminal and the identifier of the synchronization group, and the synchronization group create message is used for requesting the second terminal to join the synchronization group; the processor is further configured to agree to join the synchronization group; the processor is further configured to invoke the transceiver to send a synchronization group join message, where the synchronization group join message includes an identifier of the first terminal and the identifier of the synchronization group; the processor is further configured to store group member information including the identifier of the creating terminal in the memory; the processor is further configured to invoke the group member information in the memory and invoke the transceiver to discover the second terminal; and the processor is configured to invoke the transceiver to establish, according to the identifier of the second terminal using the short-range wireless communications technology, the connection to the second terminal.

With reference to the second possible implementation manner, in a third possible implementation manner, the processor is further configured to invoke the transceiver to receive a synchronization group join message sent by a third terminal that agrees to join the synchronization group, where the synchronization group join message sent by the third terminal includes an identifier of the third terminal and the identifier of the synchronization group; and the processor is further configured to store group member information including the identifier of the third terminal in the memory.

With reference to the first possible implementation manner, in a fourth possible implementation manner, the processor is configured to invoke the transceiver to multicast the synchronization group create message to the second terminal in a local area network; and receive the synchronization group join message multicasted in the local area network by the second terminal that agrees to join the synchronization group.

With reference to the first possible implementation manner, in a fifth possible implementation manner, the processor is configured to invoke the transceiver to send the synchronization group create message to a message server, such that the message server forwards the synchronization group create message to the second terminal; and receive the synchronization group join message that is sent by the second terminal that agrees to join the synchronization group and is forwarded by the message server.

With reference to the first possible implementation manner, in a sixth possible implementation manner, the synchronization group create message carries the identifier of the first terminal, the identifier of the synchronization group, and a shared folder name; the processor is further configured to create a shared folder corresponding to the shared folder name in the memory, and store description information of the content for sharing in the shared folder; and the processor is configured to invoke the transceiver and the connection established to the second terminal to synchronize, according to the description information of the content for sharing stored in the shared folder of the first terminal and description information of the content for sharing stored in a shared folder of the second terminal, the content for sharing with the second terminal.

With reference to the second possible implementation manner, in a seventh possible implementation manner, the synchronization group create message carries the identifier of the creating terminal, the identifier of the synchronization group, and a shared folder name; the processor is further configured to create a shared folder corresponding to the shared folder name in the memory, and store description information of the content for sharing in the shared folder; and the processor is configured to invoke the transceiver and the connection established to the second terminal to synchronize, according to the description information of the content for sharing stored in the shared folder of the first terminal and description information of the content for sharing stored in a shared folder of the second terminal, the content for sharing with the second terminal.

With reference to the fifth aspect or the first possible implementation manner to the fifth possible implementation manner, in an eighth possible implementation manner, the processor is configured to invoke the transceiver to acquire description information, on a central node, of the content for sharing of the second terminal, where the central node belongs to the synchronization group; and synchronize the content for sharing of the second terminal according to the description information, on the central node, of the content for sharing of the second terminal.

With reference to the fifth aspect or the first possible implementation manner to the eighth possible implementation manner, in a ninth possible implementation manner, the processor is further configured to execute at least one of the following: authenticating the second terminal; and determining whether a current moment falls within a preset synchronization period of time.

According to a sixth aspect, the present disclosure provides a second terminal, where the second terminal includes a processor, a memory, and a transceiver, where the processor is configured to determine content for sharing of the second terminal and store the content for sharing of the second terminal in the memory; the processor is further configured to, when the second terminal is discovered by a first terminal, invoke the transceiver to establish, using a short-range wireless communications technology, a connection to the first terminal, where the second terminal belongs to a same synchronization group as the first terminal, and can establish a connection to the first terminal using a short-range wireless communications technology, and terminals that belong to a same synchronization group can synchronize content for sharing; and the processor is further configured to invoke the transceiver and the connection established to the first terminal to synchronize the content for sharing of the second terminal and content for sharing of the first terminal.

With reference to the sixth aspect, in a first possible implementation manner, the processor is further configured to invoke the transceiver to send a synchronization group create message to the first terminal, where the synchronization group create message carries an identifier of the second terminal and an identifier of the synchronization group, and the synchronization group create message is used for requesting the first terminal to join the synchronization group; and receive a synchronization group join message returned by the terminal to agree to join the synchronization group, where the synchronization group join message includes an identifier of the first terminal that agrees to join the synchronization group and the identifier of the synchronization group; the processor is further configured to store group member information including the identifier of the first terminal in the memory; and the processor is configured to invoke the transceiver to establish, according to the identifier of the first terminal using the short-range wireless communications technology, the connection to the first terminal.

With reference to the sixth aspect or the first possible implementation manner, in a second possible implementation manner, the processor is further configured to invoke the transceiver to receive a synchronization group create message sent by a creating terminal, where the synchronization group create message carries an identifier of the creating terminal and the identifier of the synchronization group, and the synchronization group create message is used for requesting the second terminal to join the synchronization group; the processor is further configured to agree to join the synchronization group; the processor is further configured to invoke the transceiver to send a synchronization group join message, where the synchronization group join message includes the identifier of the second terminal and the identifier of the synchronization group; and the processor is further configured to store group member information including the identifier of the creating terminal in the memory.

With reference to the first possible implementation manner, in a third possible implementation manner, the synchronization group create message carries the identifier of the second terminal, the identifier of the synchronization group, and a shared folder name; the processor is configured to create a shared folder corresponding to the shared folder name in the memory, and store description information of the content for sharing in the shared folder; and the processor is configured to invoke the transceiver, the connection established to the first terminal, and the memory to synchronize, according to the description information of the content for sharing stored in the shared folder of the second terminal and description information of the content for sharing stored in a shared folder of the first terminal, the content for sharing with the first terminal.

With reference to the second possible implementation manner, in a fourth possible implementation manner, the synchronization group create message carries the identifier of the creating terminal, the identifier of the synchronization group, and a shared folder name; the processor is configured to create a shared folder corresponding to the shared folder name in the memory, and store description information of the content for sharing in the shared folder; and the processor is configured to invoke the transceiver and the connection established to the first terminal and invoke the memory to synchronize, according to the description information of the content for sharing stored in the shared folder of the second terminal and description information of the content for sharing stored in a shared folder of the first terminal, the content for sharing with the first terminal.

With reference to the sixth aspect or the first possible implementation manner to the second possible implementation manner, in a fifth possible implementation manner, the processor is further configured to invoke the transceiver to acquire description information, on a central node, of the content for sharing of the first terminal, where the central node belongs to the synchronization group; and synchronize the content for sharing of the first terminal according to the description information, on the central node, of the content for sharing of the first terminal.

With reference to the sixth aspect or the first possible implementation manner to the fourth possible implementation manner, in a sixth possible implementation manner, the processor is further configured to execute at least one of the following: authenticating the first terminal; and determining whether a current moment falls within a preset synchronization period of time.

The embodiments of the present disclosure provide a method for synchronizing content among terminals. The method includes determining, by a first terminal, content for sharing of the first terminal; when the first terminal discovers a second terminal, establishing, by the first terminal, a connection to the second terminal using a short-range wireless communications technology, where the second terminal belongs to a same synchronization group as the first terminal, and can establish a connection to the first terminal using a short-range wireless communications technology, and terminals that belong to a same synchronization group can synchronize content for sharing; and synchronizing, by the first terminal, the content for sharing of the first terminal and content for sharing of the second terminal using the connection established to the second terminal. Based on the foregoing solution, because content for sharing can be synchronized among terminals in a synchronization group, when a first terminal discovers a second terminal, the first terminal establishes a connection to the second terminal using a short-range wireless communications technology, and content for sharing is synchronized between the first terminal and the second terminal; and a user no longer manually establishes a communication connection and then manually selects a file to send the file, so as to reduce operations of the user as much as possible and conveniently implement synchronization of the content for sharing among the terminals.

BRIEF DESCRIPTION OF DRAWINGS

To describe the technical solutions in the embodiments of the present disclosure more clearly, the following briefly introduces the accompanying drawings required for describing the embodiments or the prior art. The accompanying drawings in the following description show merely some embodiments of the present disclosure, and persons of ordinary skill in the art may still derive other drawings from these accompanying drawings without creative efforts.

DESCRIPTION OF EMBODIMENTS

Figure 1:
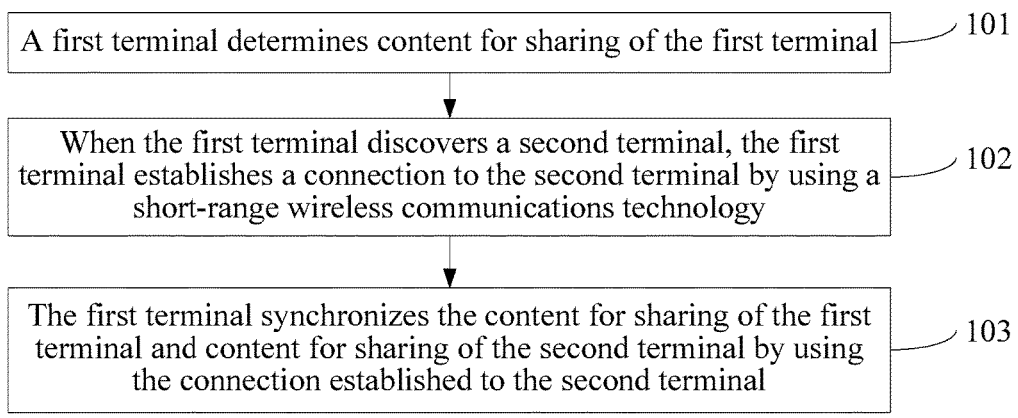
FIG. 1 is a schematic flowchart 1 of a method for synchronizing content among terminals according to an embodiment of the present disclosure.

The following clearly describes the technical solutions in the embodiments of the present disclosure with reference to the accompanying drawings in the embodiments of the present disclosure. The described embodiments are merely some rather than all of the embodiments of the present disclosure. All other embodiments obtained by persons of ordinary skill in the art based on the embodiments of the present disclosure without creative efforts shall fall within the protection scope of the present disclosure.

Some expressions that appear in the embodiments are described as follows.

For "when the first terminal discovers a second terminal, the first terminal establishes a connection to the second terminal using a short-range wireless communications technology" in the embodiments, a subsequent operation of establishing the connection does not necessarily execute immediately after the first terminal discovers the second terminal, but that the first terminal discovers the second terminal is a trigger condition of executing the subsequent operation of establishing the connection.

Descriptions such as the "first", "second", and "third" in the embodiments merely help to describe terminals and steps of methods, and do not imply a specific sequence or other specific meanings.

In the embodiments, a first terminal refers to a terminal that actively discovers another terminal in a synchronization group, and a second terminal refers to a terminal that belongs to the same synchronization group as the first terminal and can establish a connection to the first terminal using a short-range wireless communications technology.

In the embodiments, each synchronization group includes two or more terminals, and the synchronization group is a group in which terminals in the group are allowed to automatically synchronize content for sharing with each other.

In the embodiments, an identifier of a synchronization group is used for identifying the synchronization group, and the first terminal can identify, according to the identifier of the synchronization group, whether another terminal nearby that is discovered by the first terminal is a terminal that belongs to the same synchronization group as the first terminal. Terminals that belong to a same synchronization group may save an identifier of the synchronization group after the synchronization group is created, and a message that is subsequently sent among these terminals may carry the identifier of the synchronization group, and a terminal that receives the message can learn, according to the identifier of the synchronization group, a synchronization group to which a terminal that sends the message belongs.

In the embodiments, an identifier of a terminal is used for identifying the terminal. In a process of creating a synchronization group, each first terminal may store an identifier of each terminal in the synchronization group, such that the first terminal can identify, according to the identifier of each terminal in the synchronization group, whether another terminal nearby that is discovered by the first terminal is a terminal that belongs to the same synchronization group as the first terminal. In addition, the first terminal may further establish, according to an identifier of a second terminal, a connection to the second terminal using a short-range wireless technology.

Content for sharing refers to content that a terminal agrees to display or send to another terminal, and may be set by a user or use a default setting. The content for sharing includes: a new photographed/recorded photo, video or audio, a media photo, video or audio that is locally saved or uploaded to a network, or data of other types, for example, text files such as .txt, .PDF, and .word, which is not specifically limited in the embodiments of the present disclosure.

Description information of the content includes a name of the content, and may further include any piece of the following information: creation time, size, format, and uniform resource locator (URL). For example, as shown in Table 1, content for sharing determined by the first terminal includes the following content:

TABLE 1

| Name | Creation time | Size | Format | URL |
|---|---|---|---|---|
| Song A | 2014 Mar. 8 | 3 MB | wma | D\Song |
| Song B | 2014 Mar. 8 | 3 MB | wma | D\Song |

It should be noted that, a directory of content for sharing mentioned in the embodiments refers to a set including description information of the content for sharing, as shown in Table 1. Table 1 is only an exemplary description, and a directory of content for sharing may be represented in other forms.

A short-range wireless communications technology refers to a wireless communications technology in which two communications parties transmit information using radio waves and a transmission distance is constrained within a short range (within tens of meters). For example, Wi-Fi, Bluetooth, ZigBee, infrared, and near field communication (NFC) are generally considered as short-range wireless communications technologies.

Synchronization of content for sharing refers to that the first terminal acquires some or all of content for sharing of the second terminal, and/or the second terminal acquires some or all of content for sharing of the first terminal, and within a certain period of time, the content for sharing of the first terminal is kept consistent with the content for sharing of the second terminal.

More specifically, that the first terminal synchronizes content for sharing with the second terminal may be that the first terminal acquires all content for sharing to be synchronized of the second terminal, the second terminal acquires all content for sharing to be synchronized of the first terminal, and finally, within a certain period of time, content for sharing of the first terminal and content for sharing of the second terminal include the content for sharing of the first terminal before synchronization and the content for sharing of the second terminal before synchronization.

It should be noted that because of a problem that content for sharing stored in the first terminal and content for sharing stored in the second terminal may be repetitive, to avoid unnecessary processing overheads, the first terminal acquires content for sharing, which is not stored in the first terminal, in the second terminal, and the second terminal acquires content for sharing, which is not stored in the second terminal, in the first terminal, and finally, within a certain period of time, the content for sharing of the first terminal and the content for sharing of the second terminal include common content for sharing of the first terminal and the second terminal before synchronization, non-common content for sharing in the first terminal, and non-common content for sharing in the second terminal.

When the content for sharing of the first terminal and the content for sharing of the second terminal are synchronized, the content for sharing of the first terminal may be used as a reference, that is, when the content for sharing of the first terminal is not consistent with the content for sharing of the second terminal, the content for sharing of the second terminal is updated to be the content for sharing of the first terminal. On the contrary, the content for sharing of the second terminal may be used as a reference, that is, when the content for sharing of the first terminal is not consistent with the content for sharing of the second terminal, the content for sharing of the first terminal is updated to be the content for sharing of the second terminal. During implementation, a user may set a reference for synchronization, or a terminal (for example, a terminal that actively performs a discovery, or a terminal that creates a synchronization group, or a terminal whose content for sharing is updated most recently) in a synchronization group is used as a reference by default.

It may be understood that, during synchronization, an incremental synchronization manner or a full synchronization manner may be used, and for specific implementation, refer to a related existing technology, which is not described in detail herein again.

In view of a problem that lots of operation processes of a user cause inconvenience to the user when Bluetooth and DLNA are used to perform content synchronization in the prior art, an embodiment of the present disclosure provides a method for synchronizing content among terminals. As shown in FIG. 1, the method includes the following steps.

101. A first terminal determines content for sharing of the first terminal.

102. When the first terminal discovers a second terminal, the first terminal establishes a connection to the second terminal using a short-range wireless communications technology.

The second terminal belongs to a same synchronization group as the first terminal, and can establish a connection to the first terminal using a short-range wireless communications technology, and terminals that belong to a same synchronization group can synchronize content for sharing.

For the terminals that belong to the same synchronization group, each terminal may serve as the first terminal to discover a terminal nearby in real time or periodically or after being triggered by a user, and determine whether the discovered terminal and the terminal that actively performs a discovery belong to the same synchronization group. Each terminal may record an identifier of the synchronization group and/or identifiers of all the terminals included in the synchronization group. The terminal may determine, according to the recorded identifier of the synchronization group and/or the recorded identifiers of all the terminals included in the synchronization group, which discovered terminals nearby is the second terminals.

An identifier of the second terminal may be used by the first terminal to identify, according to the identifiers of all the terminals included in the synchronization group, whether a discovered terminal nearby is a second terminal that belongs to the same synchronization group as the first terminal, or the identifier of the second terminal may be used by the first terminal to establish the connection to the second terminal according to the identifier of the second terminal using the short-range wireless communications technology.

An identifier of a terminal in the synchronization group includes at least one of the following: a universally unique identifier (UUID), an IP address, a Media Access Control (MAC) address, a BT address, an instant messaging service account, an email address, and a telephone number of the terminal.

The instant messaging service account may be an account of instant messaging software such as QQ, MSN, Skype, or WeChat.

It may be understood that a terminal that actively performs a discovery (which may be any terminal that has joined the synchronization group) may first discover all terminals nearby that can establish short-range wireless communication, and then determine whether these discovered terminals belong to the same synchronization group as the terminal that actively performs a discovery. A terminal that belongs to the same synchronization group as the terminal that actively performs a discovery is a second terminal to be found. The terminal that actively performs a discovery may also attempt to establish a short-range wireless communication connection to these terminals according to the identifier of the synchronization group and/or the identifiers of all the terminals included in the synchronization group, and a terminal that can successfully establish a short-range wireless communication connection to the terminal that actively performs a discovery is a second terminal.

Optionally, if the first terminal is located in a wireless local area network (WLAN), the first terminal listens to a Simple Service Discovery Protocol (SSDP) packet or a multicast domain name system (mDNS) packet sent by another device in the WLAN, or the first terminal actively sends a universal plug and play (UPnP) Search message in the WLAN and listens to a response packet returned by a device in the network. If a packet obtained through listening by the first terminal carries the recorded identifier of the synchronization group and/or the identifier of the second terminal included in the synchronization group, it is determined that a device that sends the packet is the second terminal.

Optionally, the first terminal may further discover a second terminal using BT. That is, the first terminal enables a BT function and then scans for a BT device nearby, matches an identifier of a BT device obtained through scanning with the identifiers, which are recorded by the first terminal, of all the terminals included in the synchronization group, and if the identifier of the BT device matches a recorded identifier of a terminal, determines that the BT device obtained through scanning is the second terminal.

Optionally, the first terminal may further discover a terminal nearby using Wi-Fi. That is, the first terminal enables a Wi-Fi Direct function and then scans for a Wi-Fi device nearby, matches an identifier of a Wi-Fi device obtained through scanning with the recorded identifiers of all the terminals included in the synchronization group, and if the identifier of the Wi-Fi device matches a recorded identifier of a terminal, determines that the Wi-Fi device obtained through scanning is the second terminal.

After discovering a second terminal nearby, the first terminal may establish a connection to the second terminal using a short-range wireless communications technology.

Optionally, if the first terminal is located in the WLAN, the first terminal establishes a Transmission Control Protocol (TCP)/IP connection to the second terminal using a URL carried in a response packet that is obtained through listening and returned by a synchronize terminal.

Optionally, if the first terminal establishes the connection to the second terminal using the BT, and if the identifiers, which are recorded by the first terminal, of all the terminals included in the synchronization group are BT addresses of second terminals, the first terminal pairs a BT address of the first terminal with a BT address of a second terminal that is obtained through scanning, to establish a connection.

If the identifiers, which are recorded by the first terminal, of all the terminals included in the synchronization group are other identifiers such as UUIDs, instant messaging accounts, email addresses, or IP addresses, the first terminal obtains, through interaction using a BT protocol, the BT address of the second terminal obtained through scanning. The first terminal then pairs the BT address of the first terminal with the BT address of the second terminal obtained through scanning, to establish a connection.

Optionally, if the first terminal establishes the connection to the second terminal using Wi-Fi Direct, and if the identifiers, which are recorded by the first terminal, of all the terminals included in the synchronization group are MAC addresses, the first terminal establishes, according to a MAC address of the first terminal and a MAC address of a second terminal obtained through scanning, a Wi-Fi Direct connection to the second terminal.

If the identifiers, which are recorded by the first terminal, of all the terminals included in the synchronization group are other identifiers such as UUIDs, instant messaging accounts, email addresses, or IP addresses, the first terminal obtains, through interaction using a Wi-Fi protocol, the MAC address of the second terminal obtained through scanning. The first terminal then establishes, according to the MAC address of the first terminal and the MAC address of the second terminal that is obtained through scanning, a Wi-Fi Direct connection to the second terminal.

Further, the foregoing establishment of a Wi-Fi Direct connection between two terminals may be extended to multiple terminals. Wi-Fi Direct supports creation of a point-to-point ad hoc temporary network among multiple terminals, where one terminal serves as a network creater (also called Group Owner or GO). Therefore, when the first terminal performs a search and discovers multiple second terminals nearby, the first terminal may create an ad hoc network with these found second terminals.

103. The first terminal synchronizes the content for sharing of the first terminal and content for sharing of the second terminal using the connection established to the second terminal.

As described above, the first terminal and the second terminal may establish a TCP/IP connection using a WLAN, or may establish a connection using Bluetooth pairing, or establish a Wi-Fi-Direct connection, and create a point-to-point ad hoc temporary network using multiple terminals connected using Wi-Fi Direct. The first terminal may synchronize the content for sharing with the second terminal using a connection in at least one manner above.

For example, if the first terminal and the second terminal establish the connection using Bluetooth pairing, the first terminal and the second terminal are paired to establish an upper-layer service session, acquire the content for sharing of each other, and determine which content is not locally stored, such that content that is not locally stored is acquired from a paired BT device, and then incremental synchronization is performed.

BT devices may be paired to establish an upper-layer service session using an IP-based protocol such as the BT audio/video (AV) Profile protocol, the UPnP/DLNA, the Intelligent Grouping and Resource Sharing (IGRS) or the mDNS.

Alternatively, if the first terminal and the second terminal establish the connection using Bluetooth pairing, the first terminal and the second terminal exchange, using a BT connection, Wi-Fi configuration information, for example, information such as a channel identifier, a MAC address, and a key, and then establish a Wi-Fi Direct connection and a TCP/IP connection over the Wi-Fi Direct connection. The first terminal may synchronize, using the foregoing upper-layer service session, the content for sharing.

For example, if the first terminal and the second terminal establish the connection using Wi-Fi Direct, the first terminal and the second terminal then establish an upper-layer service session such as the UPnP, the DLNA, the IGRS, and the mDNS, to synchronize the content for sharing.

Optionally, for terminals that access a same WLAN and join a same synchronization group, content for sharing may be synchronized using a central node. The central node belongs to the synchronization group, that is, the central node is any one of the second terminals or is the first terminal itself. A second terminal that initiates creation of the synchronization group may serve as the central node, and another second terminal that does not initiate creation of the synchronization group may serve as the central node. Optionally, the method includes acquiring, by the first terminal, description information, on the central node, of the content for sharing of the second terminal, where the central node belongs to the synchronization group; and synchronizing, by the first terminal, the content of the second terminal according to the description information, on the central node, of the content for sharing of the second terminal and description information of the content for sharing of the first terminal.

The central node stores the description information of the content for sharing of the second terminal, and may further store the description information of the content for sharing of the first terminal. If the central node does not store the description information of the content for sharing of the first terminal, when the first terminal performs synchronization, acquires the description information of the content for sharing of the first terminal locally from the first terminal.

The description information of the content for sharing of the first terminal may be saved in a shared folder in the first terminal, and is then sent to the central node, or may be not stored in the shared folder in the first terminal, and instead is stored in another file, and is then sent to the central node. The description information of the content of the second terminal may be saved in a shared folder in the second terminal, and is then sent to the central node, or may be not stored in the shared folder in the second terminal, and instead is stored in another file and then sent to the central node.

In addition, the central node may store the content for sharing of the second terminal, and the first terminal synchronizes the content for sharing of the second terminal from the central node according to the description information, on the central node, of the content for sharing to be synchronized of the second terminal; or the first terminal may acquire the content for sharing of the second terminal from the second terminal or another device according to the description information, acquired from the central node, of the content for sharing of the second terminal, which is not limited in this embodiment of the present disclosure.

An implementation manner of synchronizing, using the central node, the content for sharing is applicable to a case in which all the terminals, or some terminals including a terminal that serves as the central node in the synchronization group access a same local area network.

More specifically, the second terminal accesses the same wireless local area network, for example, is connected to a Wi-Fi router that multicasts a same service set identifier (SSID). Therefore, by default, a creating terminal that initiates creation of the synchronization group may serve as the central node, or when joining the synchronization group, any one of the second terminals may announce, using the SSDP or using an instant messaging client, for example, by adding a field "owner" to a message for identification, to a message server that the second terminal is the central node. Another terminal records an identifier of a terminal that serves as a central node.

A process of synchronizing content for sharing among second terminals is used as an example for description in the following, where the synchronization group includes second terminals X, A, B, and C, the second terminal X is the central node, and the second terminals X, A, B, and C access a same local area network. The method includes the following steps.

(1) The terminals A, B, C, and X access a WLAN, and send multicast messages to announce that the terminals are online.

The multicast message may be SSDP:alive.

(2) Each of the terminals A, B and C determines whether the central node X is online.

Each terminal listens to an SSDP message, and finds through comparison whether an identifier of the central node is in an SSDP message obtained through listening, or sends an UPnP search message to query the central node.

(3) The central node X learns an online second terminal by listening to an announcement message.

(4) The central node X establishes a TCP connection to each online terminal and acquires content for sharing of each terminal.

More specifically, the central node first acquires a directory of the content for sharing on each terminal and determines which content is content for sharing, and subsequently, downloads the content to the central node locally. For example, an implementation manner based on the UPnP/DLNA protocol includes the following steps.

1. The terminal X that serves as the central node establishes TCP connections to the terminals A, B, and C. The terminal X uses a Browse or Search action in a UPnP content directory service (CDS) to acquire the directory of the content for sharing of the terminal A.

2. The terminal X that serves as the central node compares name information with that of locally saved content using the returned directory of the content for sharing to learn whether the content has been downloaded locally. In addition to a media name, information such as a size and a changing time may be further used for determining.

3. The terminal X that serves as the central node downloads, using the Hypertext Transfer Protocol (HTTP) protocol, the local content for sharing and saves the content for sharing with a same name.

(5) The terminals A, B, and C synchronize, using the central node X, the converged content for sharing on the terminals X, A, B, and C.

Each terminal downloads the content for sharing, for example, downloads, using the HTTP protocol, the content for sharing.

Optionally, to ensure security and privacy of terminals, before the synchronizing, by the first terminal, the content for sharing with the second terminal using the connection established to the second terminal, the method further includes authenticating, by the first terminal, the second terminal.

If the authentication succeeds, the content for sharing is synchronized between the first terminal and the second terminal.

More specifically, when each second terminal sends a synchronization group join message to the first terminal, the synchronization group join message further carries first authentication information, for example, a character string, or certificate information of the terminal. In a process in which the first terminal establishes a secure connection, for example, Transport Layer Security (TLS), to the second terminal, the first terminal acquires second authentication information sent by the second terminal, and then the first terminal matches the second authentication information with the first authentication information. If the second authentication information is the same as the first authentication information, the authentication succeeds; otherwise, the authentication fails.

Optionally, to reduce load caused by synchronization of content for sharing among terminals to the terminals, before the synchronizing, by the first terminal, the content for sharing with the second terminal using the connection established to the second terminal, the method further includes determining, by the first terminal, whether a current moment falls within a preset synchronization period of time, and if the current moment falls within the preset synchronization period of time, synchronizing the content for sharing between the first terminal and the second terminal.

More specifically, each second terminal may set a time of starting synchronization of the content for sharing. For example, for a travel activity, it may be set to perform synchronization for 1 day, and then synchronization is no longer performed and it is automatically set to perform no synchronization on a local shared folder. A creating terminal of a synchronization group may set a time window and send the time window to another terminal, and the other terminal automatically sets a same policy. In this manner, a field, for example, "Sep. 14, 2013 12:00:00-Sep. 14, 2013 18:00:00", for describing the time window may be carried in the SSDP message in the foregoing embodiment.

Optionally, before the synchronizing, by the first terminal, the content for sharing with the second terminal using the connection established to the second terminal, the method further includes authenticating, by the first terminal, the second terminal; determining, by the first terminal, whether a current moment falls within a preset synchronization period of time; and if the authentication succeeds and the current moment falls within the preset synchronization period of time, synchronizing the content for sharing between the first terminal and the second terminal.

This embodiment of the present disclosure provides a method for synchronizing content among terminals. The method includes determining, by a first terminal, content for sharing of the first terminal; when the first terminal discovers a second terminal, establishing, by the first terminal, a connection to the second terminal using a short-range wireless communications technology, where the second terminal belongs to a same synchronization group as the first terminal, and can establish a connection to the first terminal using a short-range wireless communications technology, and terminals that belong to a same synchronization group can synchronize content for sharing; and synchronizing, by the first terminal, the content for sharing of the first terminal and content for sharing of the second terminal using the connection established to the second terminal. Based on the foregoing solution, because terminals in a synchronization group are allowed to synchronize content for sharing among each other, after a first terminal discovers a second terminal, the first terminal establishes a connection to the second terminal using a short-range wireless communications technology, and content for sharing is synchronized between the first terminal and the second terminal, so as to reduce operations of a user as much as possible and conveniently implement synchronization of the content for sharing among the terminals.

Figure 2:
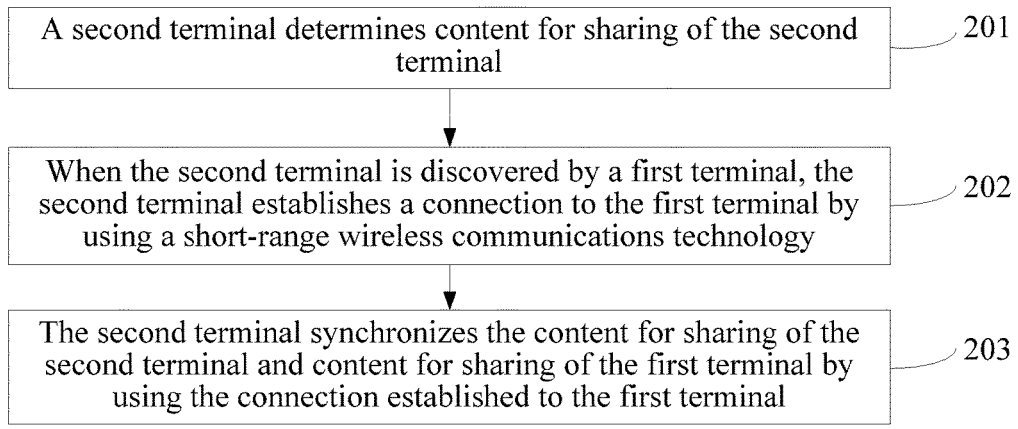
FIG. 2 is a schematic flowchart 2 of a method for synchronizing content among terminals according to an embodiment of the present disclosure.

An embodiment of the present disclosure further provides a method for synchronizing content among terminals. As shown in FIG. 2, the method includes the following steps.

201. A second terminal determines content for sharing of the second terminal.

202. When the second terminal is discovered by a first terminal, the second terminal establishes a connection to the first terminal using a short-range wireless communications technology.

The second terminal belongs to a same synchronization group as the first terminal, and can establish a connection to the first terminal using a short-range wireless communications technology, and terminals that belong to a same synchronization group can synchronize content for sharing.

For the terminals that belong to the same synchronization group, each terminal may serve as the first terminal to discover a terminal nearby in real time or periodically or after being triggered by a user, and determine whether the discovered terminal and the terminal that actively performs a discovery belong to the same synchronization group. Each terminal may record an identifier of the synchronization group and/or identifiers of all the terminals included in the synchronization group. The terminal may determine, according to the recorded identifier of the synchronization group and/or the recorded identifiers of all the terminals included in the synchronization group, which discovered terminals nearby is the second terminals.

It should be noted that, for a process of discovering the second terminal, refer to the description of the foregoing embodiment, which is not described in detail herein again in this embodiment of the present disclosure.

After the first terminal is discovered by a second terminal nearby, the first terminal may establish a connection to the second terminal using a short-range wireless communications technology. For a process of establishing the connection, refer to the description of the foregoing embodiment, which is not described in detail herein again in this embodiment of the present disclosure.

203. The second terminal synchronizes the content for sharing of the second terminal and content for sharing of the first terminal using the connection established to the first terminal.

This embodiment of the present disclosure provides a method for synchronizing content among terminals. The method includes determining, by a second terminal, content for sharing of the second terminal; when the second terminal is discovered by a first terminal, establishing, by the second terminal, a connection to the first terminal using a short-range wireless communications technology, where the second terminal belongs to a same synchronization group as the first terminal, and can establish a connection to the first terminal using a short-range wireless communications technology, and terminals that belong to a same synchronization group can synchronize content for sharing; and synchronizing, by the second terminal, the content for sharing of the second terminal and content for sharing of the first terminal using the connection established to the first terminal. Based on the foregoing solution, because terminals in a synchronization group are allowed to synchronize content for sharing among each other, after a terminal discovers a second terminal, the terminal establishes a connection to the second terminal using a short-range wireless communications technology, and content for sharing is synchronized between the second terminal and the terminal, so as to reduce operations of a user as much as possible and conveniently implement synchronization of the content for sharing among the terminals.

Figure 3:
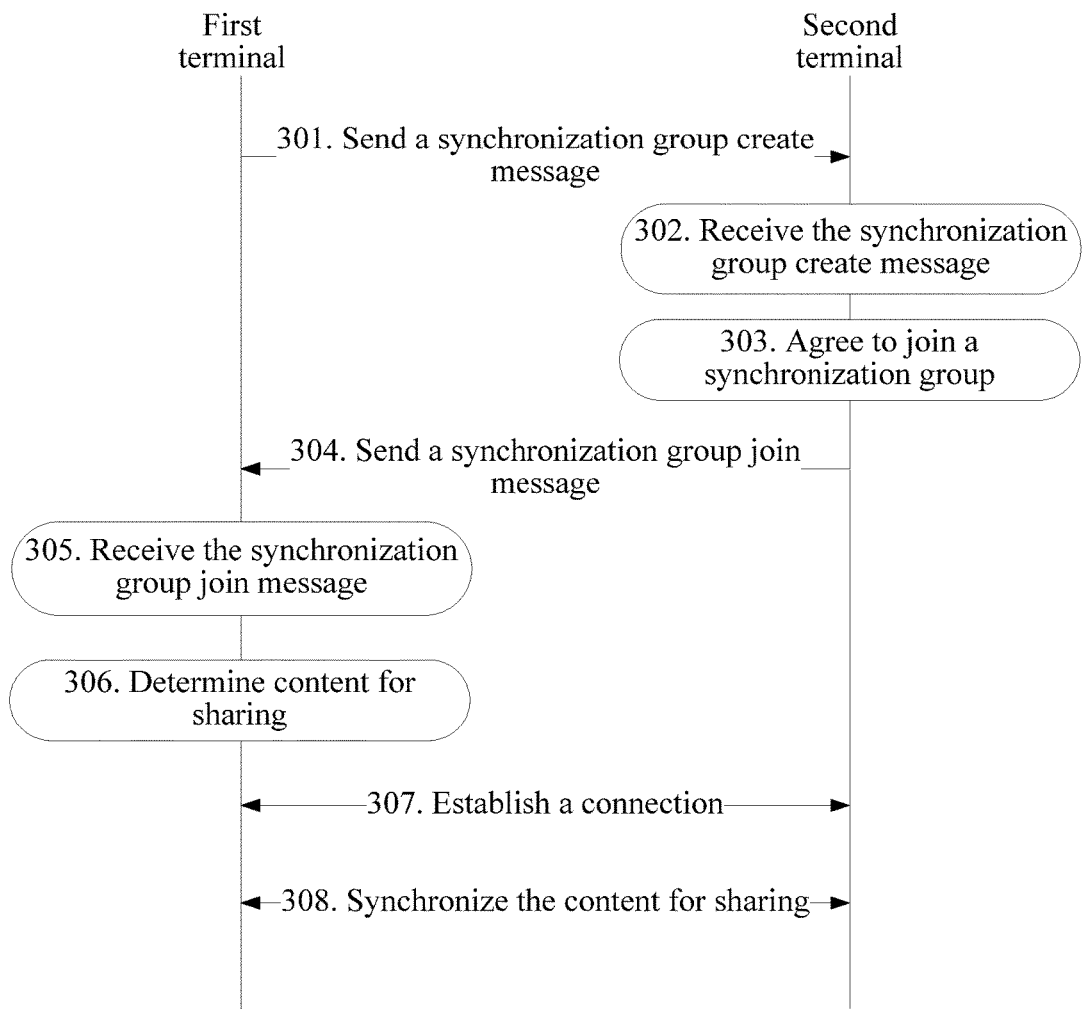
FIG. 3 is a schematic flowchart 1 of interaction of a method for synchronizing content among terminals according to an embodiment of the present disclosure.

In a scenario in which creation of the synchronization group is initiated by the first terminal, an embodiment of the present disclosure provides a method for synchronizing content among terminals. As shown in FIG. 3, the first terminal serves as a creating terminal of the synchronization group, and the method includes the following steps.

301. The first terminal sends a synchronization group create message to the second terminal, where the synchronization group create message carries an identifier of the first terminal and an identifier of the synchronization group, and the synchronization group create message is used for requesting the second terminal to join the synchronization group.

Optionally, for terminals located in a same local area network, the first terminal may send a synchronization group create message in a local communication manner in the same WLAN. For terminals that are not located in a same local area network, the first terminal may also send, using a message server, a synchronization group create message to the terminals that are not in the same local area network.

It should be noted that the local communication manner refers to a manner of sending a message to another terminal in a local area network without an operator network or the Internet.

More specifically, the local communication manner may be a communications manner based on a protocol such as the UPnP/DLNA, the mDNS/zero-configuration networking (Bonjour), or IGRS.

The terminals in the same local area network may be terminals that access a same Wi-Fi access point (AP) or an ad hoc network formed using Wi-Fi Direct.

That the first terminal sends a synchronization group create message in a local communication manner includes that the first terminal multicasts, in a local communication manner in a local area network, the synchronization group create message.

Figure 23:
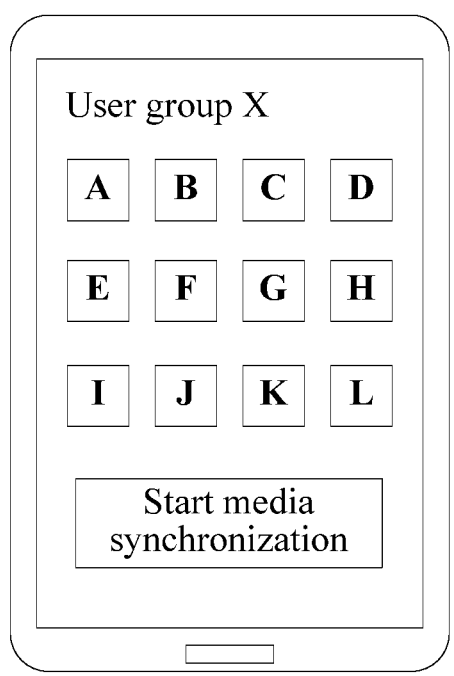
FIG. 23 is a diagram of an example of a user interface for starting a synchronization group.

For example, a user may trigger creation of the synchronization group using a newly added synchronization group create button on a user interface (UI) on a browser or an application (APP) such as an instant messaging application or a social application, such that the terminal sends, in a local communication manner in the local area network, the synchronization group create message in a multicast manner. As shown in FIG. 23, a user group name and a member list are created and displayed on an APP interface, a click on "Start media synchronization" may trigger creation of a synchronization group and invitation for another user in a same local area network to join the synchronization group, and a user that has permission to start the synchronization group may be a group manager or an ordinary member.

For example, a terminal in a same local area network based on the SSDP sends a synchronization group create message. The SSDP is an application layer protocol and is one of core protocols that form a UPnP technology. The synchronization group create message may be an SSDP: alive packet, or may be an SSDP:update packet, which is briefly referred to as an SSDP packet below. An identifier of the synchronization group and the identifier of the first terminal are included in an extension field of the SSDP packet; for example, SYNC-GROUP may include the identifier Group ID of the synchronization group and the identifier User ID of the first terminal, for example, a UUID, an IP address, a MAC address, a BT address, an instant messaging service account, an email address, or a telephone number of the first terminal.

It should be noted that, for the mDNS/Bonjour, the IGRS or other protocols in which a local area network multicast mechanism is used to announce that a device/service is online, a field may be added or extended to describe information about the created synchronization group.

That the first terminal sends a synchronization group create message to the second terminal using a message server is applicable to a case of a second terminal that is not located in a same local area network as the first terminal.

The first terminal may send the synchronization group create message to the message server using a mobile network or the Wi-Fi or in other access manners, and the message server is located in an operator network or is an over-the-top (OTT) server, for example, a short message service server, a WeChat server, or an instant messaging server.

More specifically, the first terminal sends the synchronization group create message to the message server, such that the message server forwards the synchronization group create message to the second terminal.

For example, the first terminal sends a synchronization group create message to another group member using a currently used browser, instant messaging software or social software, and a special message format may be defined using the Extensible Messaging and Presence Protocol (XMPP), and used for representing the synchronization group create message. The special message format also includes a field SYNC-GROUP, and the field may include the identifier Group ID of the synchronization group and the identifier User ID of the first terminal, for example, the UUID, the IP address, the MAC address, the BT address, the instant messaging service account, the email address, or the telephone number of the first terminal. More specifically, the special message format is as follows:

```
<message
to='groupX@example.com'
from='userA@example.com'
type='chat'
xml:lang='en'>
<body>
SYNC-GROUP-CREATE = My Group ABC, Sep-14-2013,
userA@example.com, 219.133.2.12, d1:2a:cc:44:aa:1b,
5A076f6e-6b79-4d65-6440-4437e685e0b2
</body>
</message>
```

When sending, in a local communication manner in the local area network, a synchronization group create message in a multicast manner, the first terminal may send the synchronization group create message to the message server simultaneously, and this case is applicable to that some second terminals are located in a same local area network as the first terminal and some second terminals are not located in the same local area network as the first terminal.

302. The second terminal receives the synchronization group create message sent by the first terminal.

303. The second terminal agrees to join the synchronization group.

For example, the second terminal in the same local area network enables a UPnP listening function to listen to an SSDP packet, parses a field SYNC-GROUP from the SSDP packet, learns that a new synchronization group is created, and may prompt, using a UI, a user whether to join the synchronization group. After the user confirms whether to join the synchronization group, the second terminal records an identifier of the synchronization group and the identifier of the first terminal.

304. The second terminal sends a synchronization group join message, where the synchronization group join message includes an identifier of the second terminal and the identifier of the synchronization group.

305. The first terminal receives the synchronization group join message returned by the second terminal that agrees to join the synchronization group.

Correspondingly, based on a manner in which the first terminal sends the synchronization group create message, the synchronization group join message is received in a corresponding communication manner. That is, when the first terminal receives in a local communication manner the synchronization group join message that is multicasted in the local area network, the first terminal may also receive the synchronization group join message forwarded by the message server, and may also receive the synchronization group join message in both the foregoing two manners.

It should be noted that, if in the local area network in which the first terminal is located, multiple terminals agree to join the synchronization group, in addition to that the first terminal receives the synchronization group join message that is multicasted in the local area network by the second terminal, other terminals that agree to join the synchronization group can also receive the synchronization group join message that is multicasted by the second terminal.

It should be noted that the first terminal may further receive a synchronization group join message sent by another terminal that agrees to join the synchronization group, where the synchronization group join message sent by the other terminal that agrees to join the synchronization group includes an identifier of the other terminal that agrees to join the synchronization group and the identifier of the synchronization group. More specifically, the process includes that the first terminal sends the synchronization group create message, and the second terminal and a third terminal receive the synchronization group create message sent by the first terminal; both the second terminal and the third terminal agree to join the synchronization group; the second terminal and the third terminal each send the synchronization group join message; the first terminal separately receives the synchronization group join message sent by the second terminal and the synchronization group join message sent by the third terminal; the second terminal receives the synchronization group join message sent by the third terminal; and the third terminal receives the synchronization group join message sent by the second terminal.

In the local area network, the first terminal, the second terminal, and the third terminal may send messages in a multicast manner. If the first terminal, the second terminal, and the third terminal are not in a same local area network, the first terminal, the second terminal, or the third terminal may send, using the message server, a message to the other two terminals. For a message sending manner, refer to the description of the foregoing embodiment, which is not described in detail herein again in this embodiment of the present disclosure.

The above exemplarily describes rather than limitedly describes, using the first, second, and third terminals as an example, the process of creating the synchronization group. The third terminal is only another terminal that intends to join the synchronization group except the second terminal, and there may be one third terminal, and there may also be multiple third terminals.

306. The first terminal determines content for sharing of the first terminal.

307. When the first terminal discovers a second terminal, the first terminal establishes a connection to the second terminal using a short-range wireless communications technology.

308. The first terminal synchronizes the content for sharing of the first terminal and content for sharing of the second terminal using the connection established to the second terminal.

For descriptions of step 306 to step 308, refer to the detailed description of the foregoing embodiment, which is not described in detail herein again in this embodiment of the present disclosure.

Figure 4:
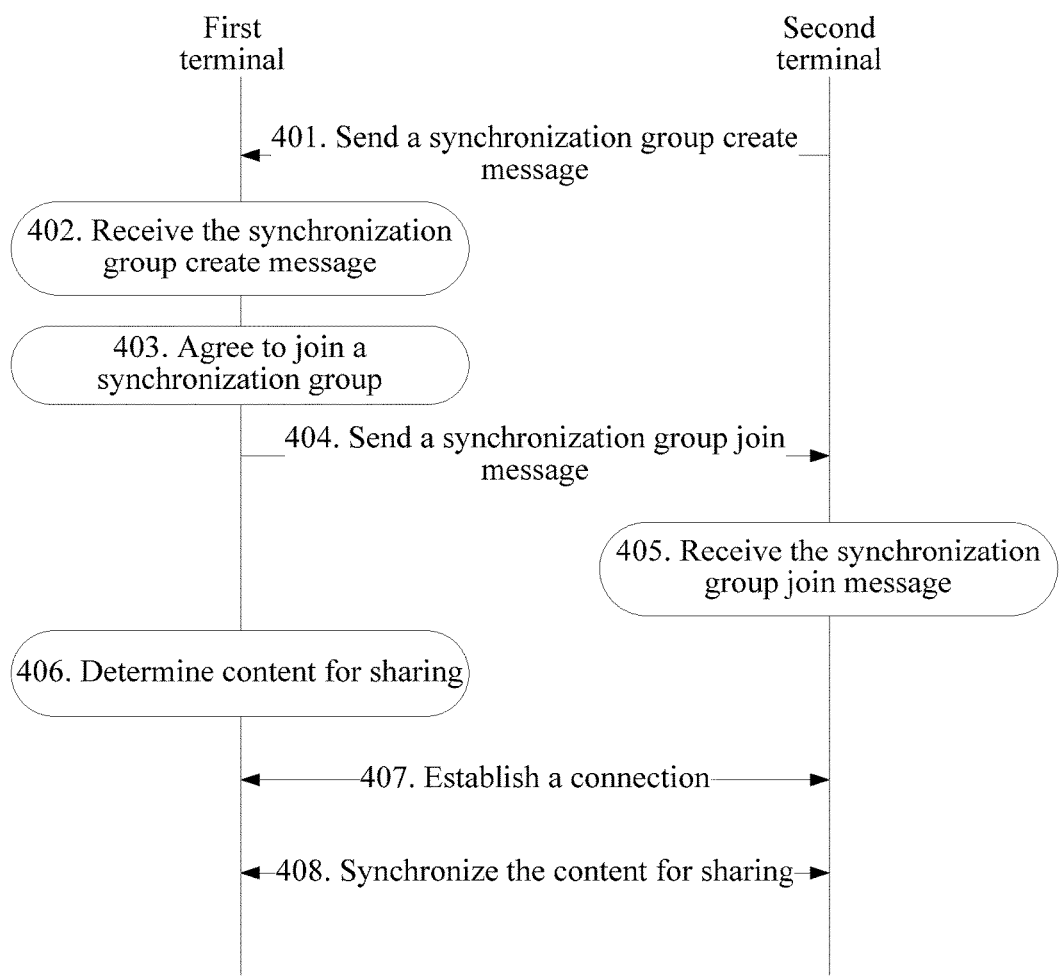
FIG. 4 is a schematic flowchart 2 of interaction of a method for synchronizing content among terminals according to an embodiment of the present disclosure.

It should be noted that in the technical solution provided by this embodiment of the present disclosure, the first terminal serves as a creating terminal of the synchronization group; however, persons skilled in the art may understand that the first terminal may also serve as a noncreating terminal of the synchronization group, and a process is shown in FIG. 4.

401. The second terminal sends a synchronization group create message to the first terminal, where the synchronization group create message carries an identifier of the second terminal and an identifier of the synchronization group, and the synchronization group create message is used for requesting the first terminal to join the synchronization group.

402. The first terminal receives the synchronization group create message sent by the second terminal.

403. The first terminal agrees to join the synchronization group.

404. The first terminal sends a synchronization group join message to the second terminal, where the synchronization group join message includes an identifier of the first terminal and the identifier of the synchronization group.

405. The second terminal receives the synchronization group join message returned by the second terminal that agrees to join the synchronization group, where the synchronization group join message includes the identifier of the first terminal and the identifier of the synchronization group.

406. The first terminal determines content for sharing of the first terminal.

407. When the first terminal discovers a second terminal, the first terminal establishes a connection to the second terminal using a short-range wireless communications technology.

408. The first terminal synchronizes the content for sharing of the first terminal and content for sharing of the second terminal using the connection established to the second terminal.

This embodiment of the present disclosure provides a method for synchronizing content among terminals. The method includes sending, by a first terminal, a synchronization group create message to another terminal, where the synchronization group create message carries an identifier of the first terminal and an identifier of a synchronization group, and the synchronization group create message is used for requesting the other terminal to join the synchronization group; receiving, by the first terminal, a synchronization group join message returned by a terminal that agrees to join the synchronization group, where the synchronization group join message includes an identifier of the terminal that agrees to join the synchronization group and the identifier of the synchronization group; discovering, by the first terminal, a second terminal that belongs to the same synchronization group as the first terminal and can establish a connection to the first terminal using a short-range wireless communications technology, where terminals that belong to a same synchronization group automatically synchronize content for sharing; establishing, by the first terminal according to the identifier of the second terminal, a connection to the second terminal using a short-range wireless communications technology; and synchronizing, by the first terminal, content for sharing with the second terminal using the connection established to the second terminal. Based on the foregoing solution, because terminals in a synchronization group created by a first terminal are allowed to synchronize content for sharing among each other, after a terminal discovers a second terminal, the terminal establishes a connection to the second terminal using a short-range wireless communications technology, and content for sharing is synchronized between the terminal and the second terminal, so as to reduce operations of a user as much as possible and conveniently implement synchronization of the content for sharing among the terminals.

Figure 5:
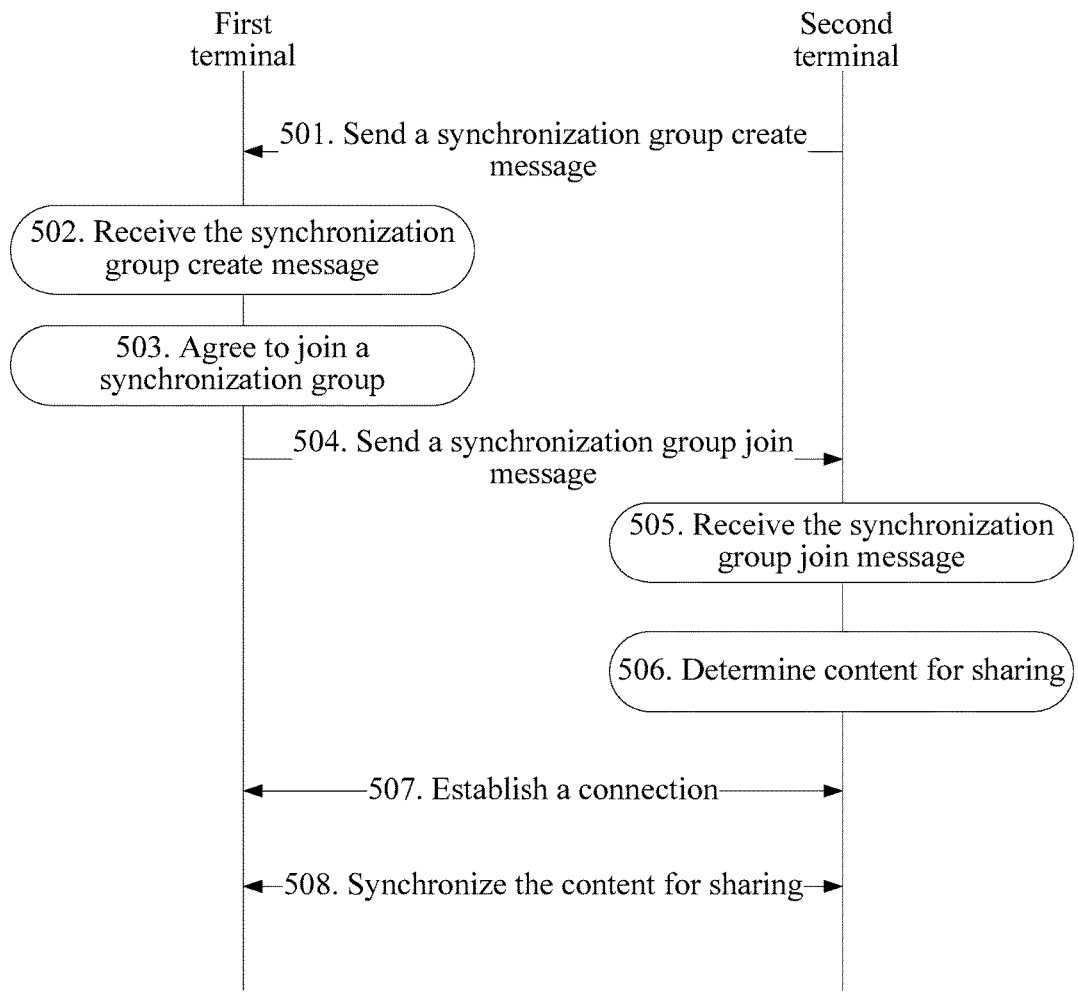
FIG. 5 is a schematic flowchart 3 of interaction of a method for synchronizing content among terminals according to an embodiment of the present disclosure.

An embodiment of the present disclosure provides a method for synchronizing content among terminals. As shown in FIG. 5, the method includes the following steps.

501. A second terminal sends a synchronization group create message to a first terminal, where the synchronization group create message carries an identifier of the second terminal and an identifier of a synchronization group, and the synchronization group create message is used for requesting the first terminal to join the synchronization group.

502. The first terminal receives the synchronization group create message sent by the second terminal.

503. The first terminal agrees to join the synchronization group.

504. The first terminal sends a synchronization group join message to the second terminal, where the synchronization group join message includes an identifier of the first terminal and the identifier of the synchronization group.

505. The second terminal receives the synchronization group join message returned by the first terminal that agrees to join the synchronization group.

506. The second terminal determines content for sharing of the second terminal.

507. When the second terminal is discovered by a first terminal, the second terminal establishes a connection to the first terminal using a short-range wireless communications technology.

508. The second terminal synchronizes the content for sharing of the second terminal and content for sharing of the first terminal using the connection established to the first terminal.

For descriptions of step 506 to step 508, refer to the detailed description of the foregoing embodiment, which is not described in detail herein again in this embodiment of the present disclosure.

Figure 6:
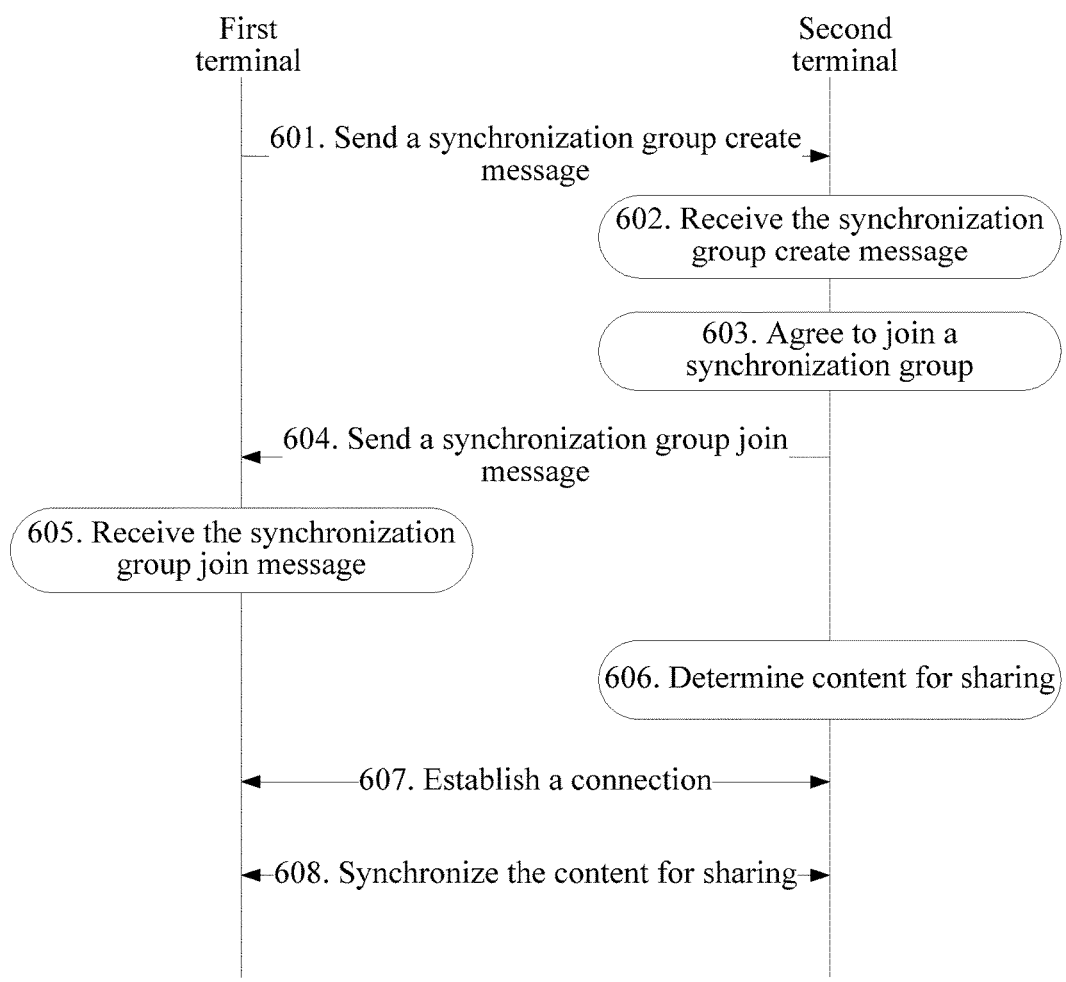
FIG. 6 is a schematic flowchart 4 of interaction of a method for synchronizing content among terminals according to an embodiment of the present disclosure.

It should be noted that in the technical solution provided by this embodiment of the present disclosure, the second terminal serves as a creating terminal of the synchronization group; however, persons skilled in the art may understand that the second terminal may also serve as a noncreating terminal of the synchronization group, and a process is shown in FIG. 6.

601. The first terminal sends a synchronization group create message to the second terminal, where the synchronization group create message carries an identifier of the first terminal and an identifier of the synchronization group, and the synchronization group create message is used for requesting the second terminal to join the synchronization group.

602. The second terminal receives the synchronization group create message sent by the first terminal.

603. The second terminal agrees to join the synchronization group.

604. The second terminal sends a synchronization group join message, where the synchronization group join message includes the identifier of the first terminal and the identifier of the synchronization group.

605. The first terminal receives the synchronization group join message returned by the second terminal that agrees to join the synchronization group.

606. The second terminal determines content for sharing of the second terminal.

607. When the second terminal is discovered by a first terminal, the second terminal establishes a connection to the first terminal using a short-range wireless communications technology.

608. The second terminal synchronizes the content for sharing of the second terminal and content for sharing of the first terminal using the connection established to the first terminal.

Figure 7:
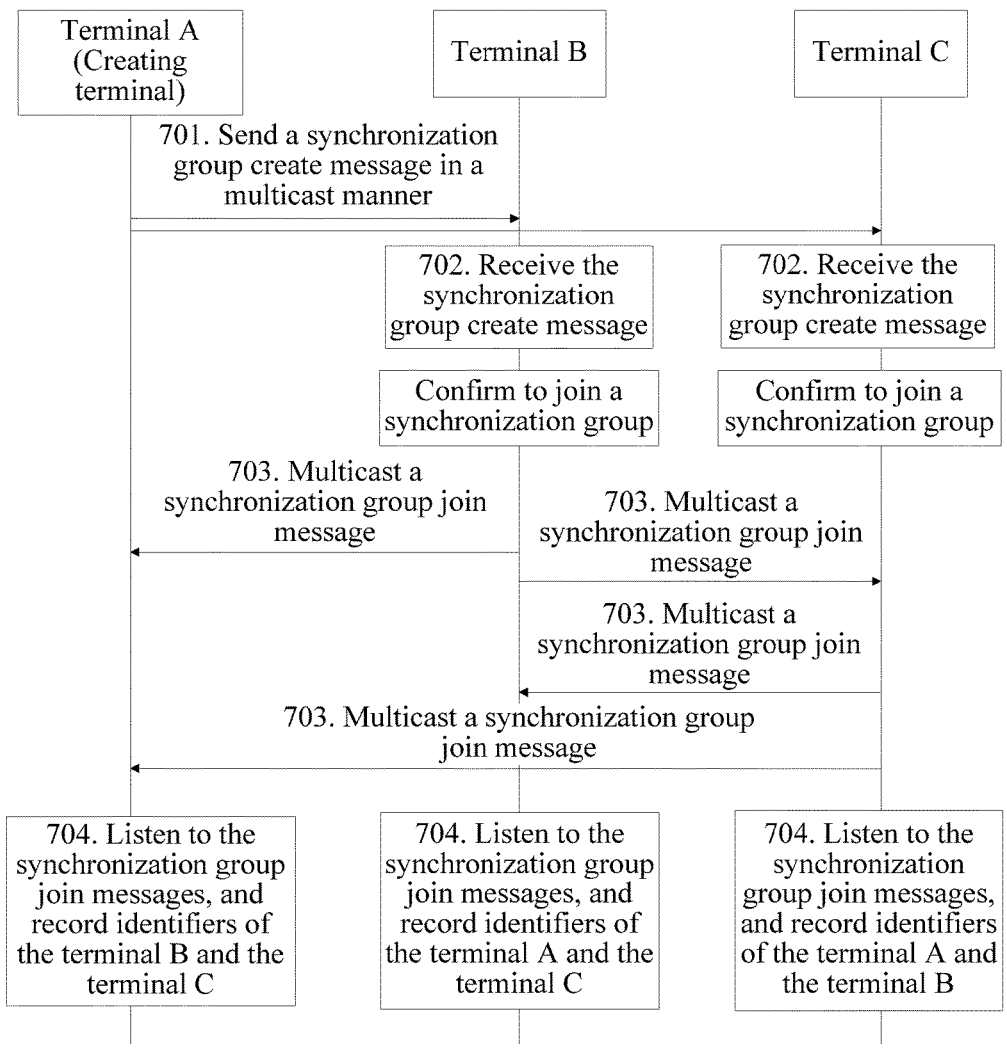
FIG. 7 is a schematic diagram of an interaction process in which terminals A, B, and C that access a same wireless local area network join a synchronization group.

An interaction process of creating a synchronization group is described in detail below using a scenario in which terminals A, B, and C access a same WLAN. As shown in FIG. 7, the process includes the following steps.

701. The terminal A sends the synchronization group create message in a multicast manner in the local area network, where the synchronization group create message carries an identifier of the synchronization group and an identifier of the terminal A.

702. The terminals B and C receive the synchronization group create message.

703. After the terminals B and C agree to join the synchronization group, the terminals B and C multicast synchronization group join messages in the local area network, where the synchronization group join messages separately include an identifier of the terminal B and an identifier of the terminal C.

704. The terminals A, B, and C listen to synchronization group join messages multicasted by other terminals.

The synchronization group join message sent by the terminal B includes the identifier of B and the identifier of the synchronization group, and the synchronization group join message multicasted by the terminal C includes the identifier of C and the identifier of the synchronization group.

Each terminal records the identifiers of the other terminals, to establish connections to the other terminals. At this point, the synchronization group has been created.

Figure 8:
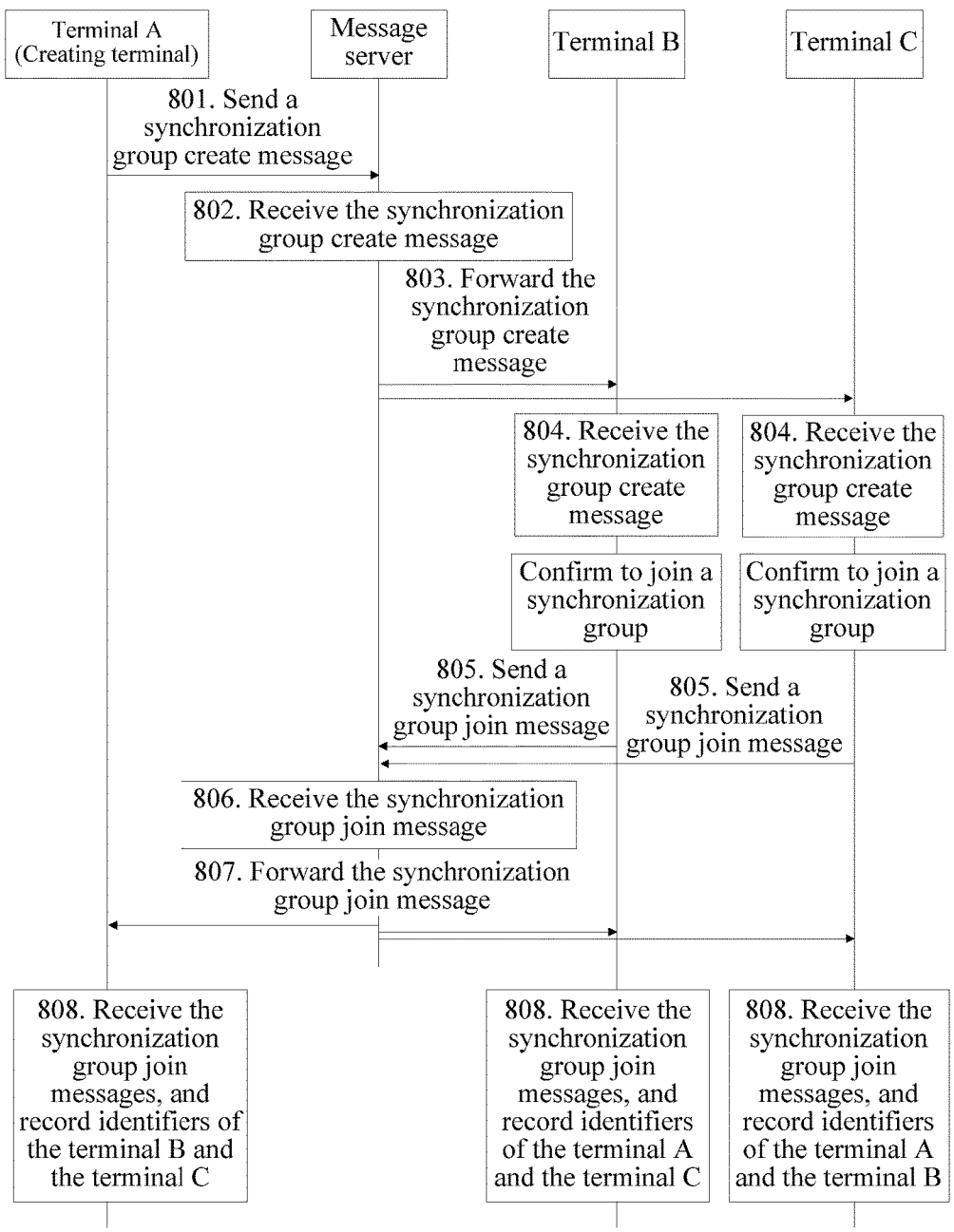
FIG. 8 is a schematic diagram of an interaction process in which terminals A, B, and C that do not access a same wireless local area network join a synchronization group.

In addition, an interaction process in which each member in a synchronization group joins the synchronization group is described below in detail using a scenario in which the terminals A, B, and C do not access a same WLAN. As shown in FIG. 8, the process includes the following steps.

801. The terminal A sends a synchronization group create message to a message server, where the synchronization group create message carries an identifier of the synchronization group and the identifier of the terminal A.

802. The message server receives the synchronization group create message sent by the terminal A.

803. The message server forwards the synchronization group create message.

804. The terminals B and C receive the synchronization group create message forwarded by the message server.

805. After the terminals B and C agree to join the synchronization group, the terminals B and C send synchronization group join messages to the message server.

The synchronization group join message sent by the terminal B includes the identifier of B and the identifier of the synchronization group, and the synchronization group join message sent by the terminal C includes the identifier of C and the identifier of the synchronization group.

806. The message server receives the synchronization group join messages sent by the terminals B and C.

807. The message server forwards the synchronization group join messages sent by the terminals B and C.

808. The terminals A, B, and C receive the synchronization group join messages forwarded by the message server.

Each terminal records the identifiers of the other terminals, to establish connections to the other terminals. At this point, the synchronization group has been created.

It should be noted that the foregoing two scenarios are merely used to exemplarily describe rather than limitedly describe three terminals in the synchronization group.

This embodiment of the present disclosure provides a method for synchronizing content among terminals. The method includes sending, by the first terminal, a synchronization group create message to a second terminal, where the synchronization group create message carries an identifier of the first terminal and an identifier of the synchronization group, and the synchronization group create message is used for requesting the second terminal to join the synchronization group; receiving, by the first terminal, a synchronization group join message returned by the second terminal, where the synchronization group join message includes an identifier of the second terminal and the identifier of the synchronization group; determining, by the first terminal, content for sharing of the first terminal; when the first terminal discovers the second terminal, establishing, by the first terminal, a connection to the second terminal using a short-range wireless communications technology, where the second terminal belongs to a same synchronization group as the first terminal, and can establish a connection to the first terminal using a short-range wireless communications technology, and terminals that belong to a same synchronization group can synchronize content for sharing; and synchronizing, by the first terminal, the content for sharing of the first terminal and content for sharing of the second terminal using the connection established to the second terminal. Based on the foregoing solution, because terminals in a group of a synchronization group created by the second terminal are allowed to synchronize content for sharing among each other, after a terminal discovers the second terminal, the terminal establishes a connection to the second terminal using a short-range wireless communications technology, and content for sharing is synchronized between the terminal and the second terminal, so as to reduce operations of a user as much as possible and conveniently implement synchronization of the content for sharing among the terminals.

Figure 9:
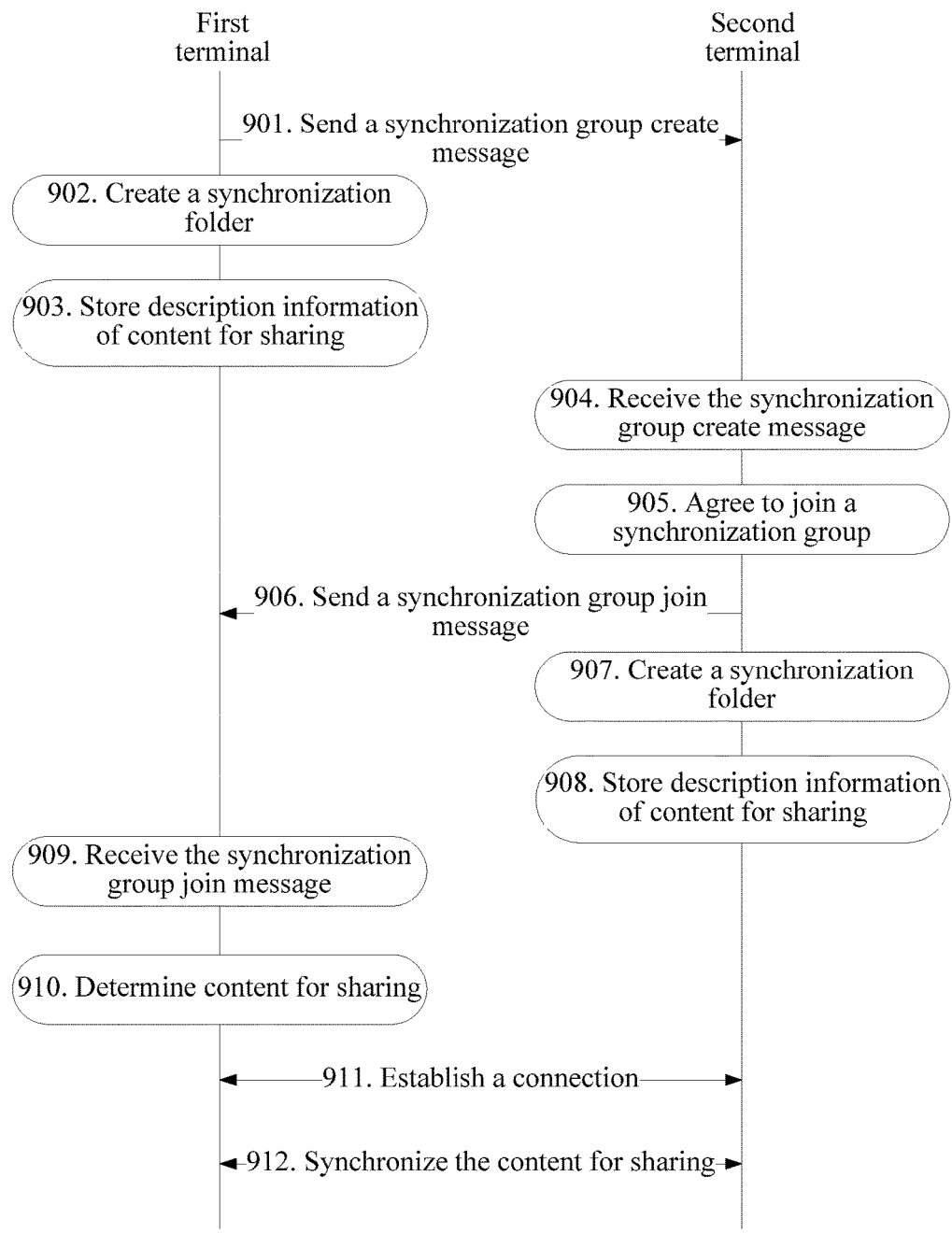
FIG. 9 is a schematic flowchart 5 of interaction of a method for synchronizing content among terminals according to an embodiment of the present disclosure.

During synchronization of the content for sharing between the first terminal and the second terminal, to make it convenient for the first terminal and the second terminal to acquire the content for sharing of each other, the terminals in the synchronization group each create a shared folder with a same name, and the shared folder may store the content for sharing. To reduce storage load of the terminals, the shared folder may store description information of the content for sharing only. An embodiment of the present disclosure provides a method for synchronizing content among terminals. As shown in FIG. 9, the method includes the following steps.

901. A first terminal sends a synchronization group create message to a second terminal, where the synchronization group create message carries an identifier of the first terminal and an identifier of a synchronization group, and the synchronization group create message is used for requesting the second terminal to join the synchronization group.

The first terminal may add a shared folder name to the synchronization group create message, such that other terminals that intend to join the synchronization group create shared folders with the same name.

For example, a terminal in a same local area network based on the SSDP sends a synchronization group create message, where the synchronization group create message may be an SSDP:alive packet, or may be an SSDP:update packet, which is briefly referred to as an SSDP packet below. The shared folder name may be included in an extension field of the SSDP, for example, SYNC-GROUP may include the shared folder name Group Folder ID.

For another example, the first terminal sends a synchronization group create message to another group member using a currently used browser, instant messaging software or social software, where a field SYNC-GROUP included in a special message format defined in the XMPP may carry the shared folder name.

902. The first terminal creates a shared folder corresponding to the shared folder name.

903. The first terminal stores description information of content for sharing in the shared folder.

It should be noted that, after determining the shared folder name, the first terminal may create the shared folder and store the description information of the content for sharing before sending the synchronization group create message, and may also create the shared folder and store the description information of the content for sharing after sending the synchronization group create message and before the second terminal synchronizes file content, which is not specifically limited in this embodiment of the present disclosure.

More specifically, after group synchronization is started, for application software (App) for video recording, photography or audio recording on a terminal, an option "Share it to a shared folder" is added to a UI. Click on this option indicates that a user agrees to share, to the synchronization group, currently recorded content or content to be recorded, and the first terminal adds the description information of the content to the shared folder. For example, every time a user has recorded content (a photo, a video or audio), an App prompts, using a display button or a popup dialog box, the user whether to add the content to a shared folder, and shares the content after the user confirms whether to add the content to the shared folder; or, a checkbox is displayed on a UI of an App. If in a checked state, content that is recorded subsequently is added to a shared folder by default; and if in an unchecked state, content that is recorded subsequently is not added to the shared folder.

904. The second terminal receives the synchronization group create message sent by the first terminal.

905. The second terminal agrees to join the synchronization group.

906. The second terminal sends a synchronization group join message to the first terminal, where the synchronization group join message includes an identifier of the second terminal and the identifier of the synchronization group.

907. The second terminal creates a shared folder corresponding to the shared folder name.

908. The second terminal stores description information of the content for sharing in the shared folder.

It should be noted that, the second terminal may create the shared folder and store the description information of the content for sharing after the second terminal agrees to join the synchronization group and before the second terminal synchronizes the content for sharing with the first terminal, which is not specifically limited in this embodiment of the present disclosure.

909. The first terminal receives a synchronization group join message returned by the second terminal that agrees to join the synchronization group.

910. The first terminal determines content for sharing of the first terminal.

911. When the first terminal discovers a second terminal, the first terminal establishes a connection to the second terminal using a short-range wireless communications technology.

912. The first terminal synchronizes the content for sharing of the first terminal and content for sharing of the second terminal using the connection established to the second terminal.

It should be noted that in this embodiment of the present disclosure, only an example in which the first terminal serves as a creating terminal is used to exemplarily describe that content in the shared folder is synchronized among the terminals in the synchronization group. It may be understood that persons skilled in the art may also implement, using the technical solution disclosed in this embodiment of the present disclosure, a technical solution in which the second terminal serves as the creating terminal, which is not described in detail herein again in this embodiment of the present disclosure.

This embodiment of the present disclosure provides a method for synchronizing content among terminals. Based on the foregoing solution, because terminals in a synchronization group are allowed to synchronize content for sharing among each other, after a terminal discovers a second terminal, the terminal establishes a connection to the second terminal using a short-range wireless communications technology, and content for sharing is synchronized between the terminal and the second terminal, so as to reduce operations of a user as much as possible and conveniently implement synchronization of the content for sharing among the terminals. Further, because the first terminal and the second terminal create shared folders locally, synchronization of the content for sharing between the first terminal and the second terminal becomes more convenient.

Figure 10:
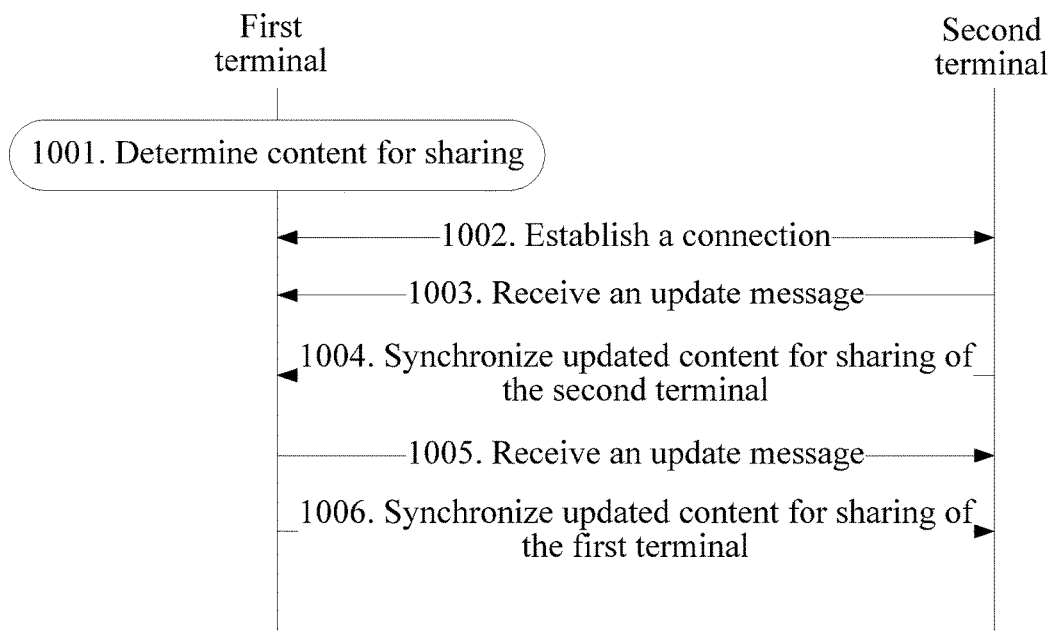
FIG. 10 is a schematic flowchart 6 of interaction of a method for synchronizing content among terminals according to an embodiment of the present disclosure.

To improve the efficiency of synchronization and reduce the number of times of unnecessary connections and a processing amount among terminals, after a synchronization group is created, every time description information of content is added to the shared folder, an update message may be sent to a second terminal. An embodiment of the present disclosure provides a method for synchronizing content among terminals. As shown in FIG. 10, the method includes the following steps.

1001. A first terminal determines content for sharing of the first terminal.

1002. When the first terminal discovers a second terminal, the first terminal establishes a connection to the second terminal using a short-range wireless communications technology.

1003. The first terminal receives an update message sent by the second terminal, where the update message carries description information of updated content for sharing of the second terminal.

1004. The first terminal synchronizes the updated content for sharing of the second terminal using the connection established to the second terminal and according to the description information of the content for sharing of the second terminal carried in the update message.

The updated content for sharing refers to the second terminal.

1005. The second terminal receives an update message sent by the first terminal, where the update message carries description information of updated content for sharing of the first terminal.

1006. The second terminal synchronizes the updated content for sharing of the first terminal using the connection established to the first terminal and according to the description information of the content for sharing of the first terminal carried in the update message.

More specifically, (1) the first terminal and the second terminal may send a multicast message in a local area network, where the multicast message carries an update prompt or a timestamp.

For example, in a wireless local area network, a field ITEM-UPDATE is added to a SSDP packet, and the field carries description information, for example, an ID/Name, a URL, a format, and an update time, of content for sharing after an update packet is sent last time. The format of the SSDP packet is as follows:

```
NOTIFY * HTTP/1.1
HOST:239.255.255.250:1900
CACHE-CONTROL:max-age = 3000
LOCATION:http://192.168.1.10:3548/ddd.xml
NT:upnp:rootdevice
NTS:ssdp:alive
SERVER:Android/4.2.0, UPnP/1.0, Huawei Ascend P6/1.05
USN:5A076f6e-6b79-4d65-6440-4437e685e0b2
SYNC-GROUP:My Group ABC, Sep-14-2013, userA@example.com
ITEM-UPDATE:20130914142210_01.jpg
```

(2) The first terminal and the second terminal may send update messages using an instant messaging application, where the update messages carry an update prompt or a timestamp.

(3) The first terminal and the second terminal may send update messages using an UPnP event, where the update messages carry an update prompt or a timestamp.

(4) The first terminal and the second terminal may send update messages using an established short-range wireless communications technology, where the update messages carry an update prompt or a timestamp.

The update message includes description information of unsynchronized content and/or a field for prompting an update, for example, "update"/"new".

It should be noted that the first terminal and the second terminal may also add an update prompt or a timestamp to a BT or Wi-Fi device discovery message, for example, a Wi-Fi Direct point-to-point scanning response message, or a BT response message.

This embodiment of the present disclosure provides a method for synchronizing content among terminals. Based on the foregoing solution, because terminals in a synchronization group are allowed to synchronize content for sharing among each other, after a terminal discovers a second terminal, the terminal establishes a connection to the second terminal using a short-range wireless communications technology, and content for sharing is synchronized between the terminal and the second terminal, so as to reduce operations of a user as much as possible and conveniently implement synchronization of the content for sharing among the terminals. Further, because the first terminal and the second terminal can actively send update messages, the efficiency of synchronization can be further improved, and the number of times of unnecessary connections and a processing amount among terminals can be reduced.

Figure 11:
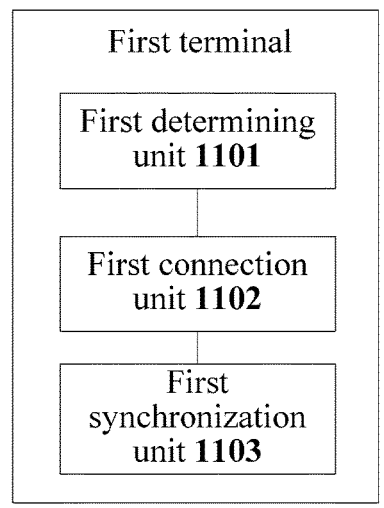
FIG. 11 is a schematic structural diagram 1 of a first terminal according to an embodiment of the present disclosure.

An embodiment of the present disclosure provides a first terminal. As shown in FIG. 11, the first terminal includes a first determining unit 1101, a first connection unit 1102, and a first synchronization unit 1103.

The first determining unit 1101 is configured to determine content for sharing of the first terminal.

The first connection unit 1102 is configured to, when the first terminal discovers a second terminal, establish a connection to the second terminal using a short-range wireless communications technology, where the second terminal belongs to a same synchronization group as the first terminal, and can establish a connection to the first terminal using a short-range wireless communications technology, and terminals that belong to a same synchronization group can synchronize content for sharing.

The first synchronization unit 1103 is configured to synchronize the content for sharing of the first terminal and content for sharing of the second terminal using the connection established to the second terminal.

Figure 12:
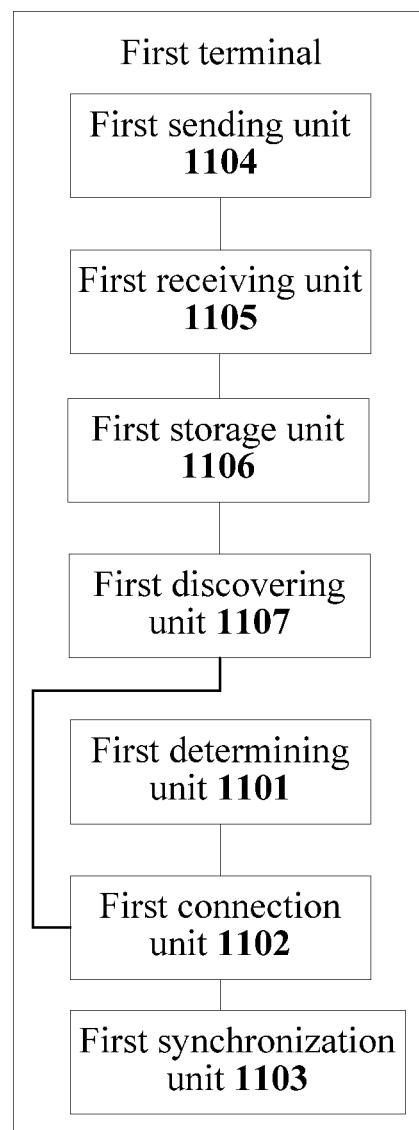
FIG. 12 is a schematic structural diagram 2 of a first terminal according to an embodiment of the present disclosure.

Optionally, as shown in FIG. 12, the first terminal further includes a first sending unit 1104, a first receiving unit 1105, a first storage unit 1106, and a first discovering unit 1107.

The first sending unit 1104 is configured to send a synchronization group create message to the second terminal, where the synchronization group create message carries an identifier of the first terminal and an identifier of the synchronization group, and the synchronization group create message is used for requesting the second terminal to join the synchronization group.

The first receiving unit 1105 is configured to receive a synchronization group join message returned by the second terminal that agrees to join the synchronization group, where the synchronization group join message includes an identifier of the second terminal and the identifier of the synchronization group.

The first storage unit 1106 is configured to store the identifier of the second terminal in group member information.

The first discovering unit 1107 is configured to discover the second terminal according to the group member information.

The first connection unit 1102 is configured to establish the connection to the second terminal according to the identifier of the second terminal using the short-range wireless communications technology.

Figure 13:
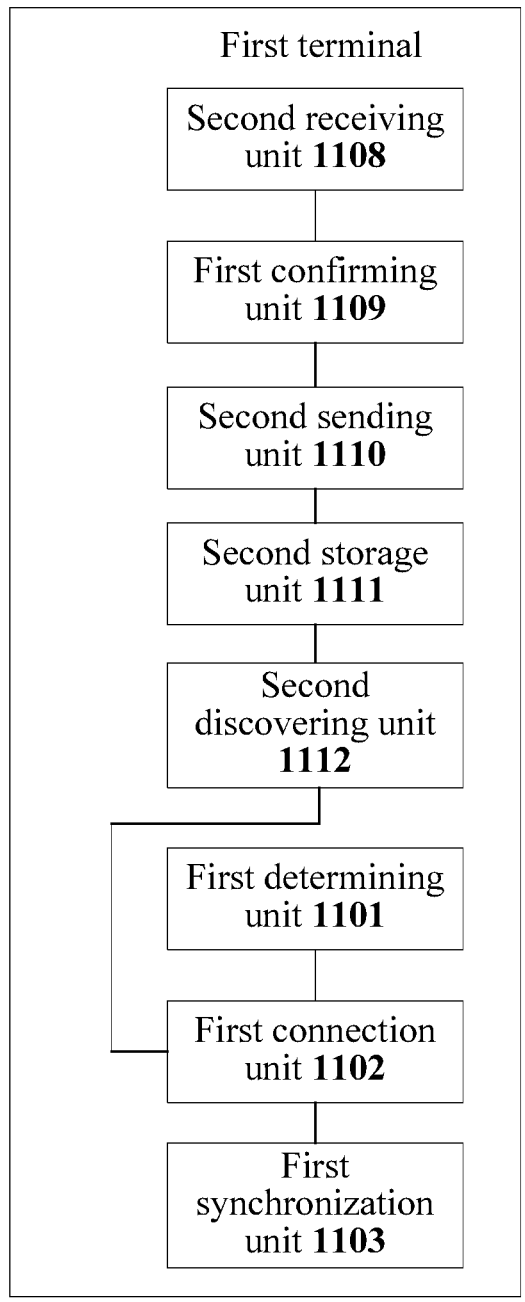
FIG. 13 is a schematic structural diagram 3 of a first terminal according to an embodiment of the present disclosure.

Optionally, as shown in FIG. 13, the first terminal further includes a second receiving unit 1108, a first confirming unit 1109, a second sending unit 1110, a second storage unit 1111, and a second discovering unit 1112.

The second receiving unit 1108 is further configured to receive a synchronization group create message sent by a creating terminal, where the synchronization group create message carries an identifier of the creating terminal and the identifier of the synchronization group, and the synchronization group create message is used for requesting the first terminal to join the synchronization group.

The first confirming unit 1109 is configured to agree to join the synchronization group.

The second sending unit 1110 is configured to send a synchronization group join message to the creating terminal, where the synchronization group join message includes an identifier of the first terminal and the identifier of the synchronization group.

The second storage unit 1111 is configured to store the identifier of the creating terminal in group member information.

The second discovering unit 1112 is configured to discover the second terminal according to the group member information.

The first connection unit 1102 is configured to establish the connection to the second terminal according to the identifier of the second terminal using the short-range wireless communications technology.

If the synchronization group includes multiple second terminals, the second receiving unit 1108 is further configured to receive a synchronization group join message sent by a third terminal that agrees to join the synchronization group, where the synchronization group join message sent by the third terminal includes an identifier of the third terminal and the identifier of the synchronization group.

The second storage unit 1111 is further configured to store the identifier of the third terminal in the group member information.

Optionally, if the first terminal and the second terminal are located in a same WLAN, the first sending unit 1104 is configured to send the synchronization group create message to the second terminal in a multicast manner in the local area network.

The first receiving unit 1105 is configured to receive the synchronization group join message multicasted in the local area network by the second terminal that agrees to join the synchronization group.

Optionally, if the first terminal and the second terminal are not located in a same WLAN, the first sending unit 1104 is configured to send the synchronization group create message to a message server, such that the message server forwards the synchronization group create message to the second terminal.

The first receiving unit 1105 is configured to receive the synchronization group join message that is sent by the second terminal that agrees to join the synchronization group and is forwarded by the message server.

Figure 14:
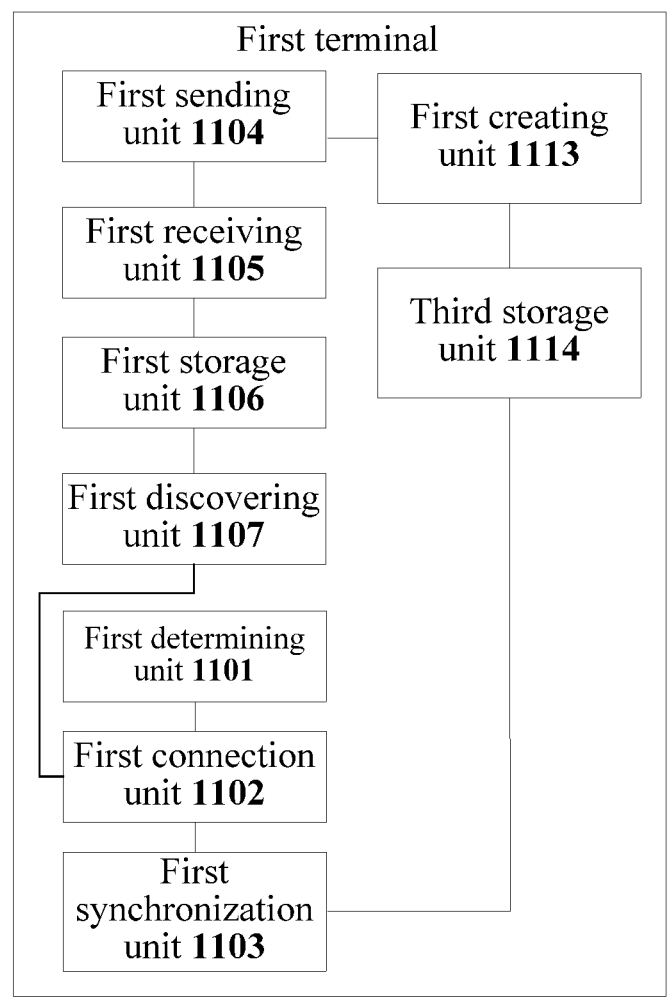
FIG. 14 is a schematic structural diagram 4 of a first terminal according to an embodiment of the present disclosure.

Optionally, during synchronization of the content for sharing between the first terminal and the second terminal, to make it convenient for the first terminal and the second terminal to acquire the content for sharing of each other, the terminals in the synchronization group each create a shared folder with a same name, and the shared folder may store the content for sharing. To reduce storage load of the terminals, the shared folder may store description information of the content for sharing only. If the first terminal serves as the creating terminal of the synchronization group, as shown in FIG. 14, the first terminal further includes a first creating unit 1113 and a third storage unit 1114.

The first sending unit 1104 is configured to send the synchronization group create message to the second terminal, where the synchronization group create message carries the identifier of the first terminal, the identifier of the synchronization group, and a shared folder name, and the synchronization group create message is used for requesting the second terminal to join the synchronization group.

The first creating unit 1113 is configured to create a shared folder corresponding to the shared folder name.

The third storage unit 1114 is configured to store description information of the content for sharing in the shared folder.

The first synchronization unit 1103 is configured to acquire, using the connection established to the second terminal and according to the description information of the content for sharing stored in the shared folder of the first terminal and description information of the content for sharing stored in a shared folder of the second terminal, corresponding content for sharing, and synchronize the content for sharing with the second terminal.

Figure 15:
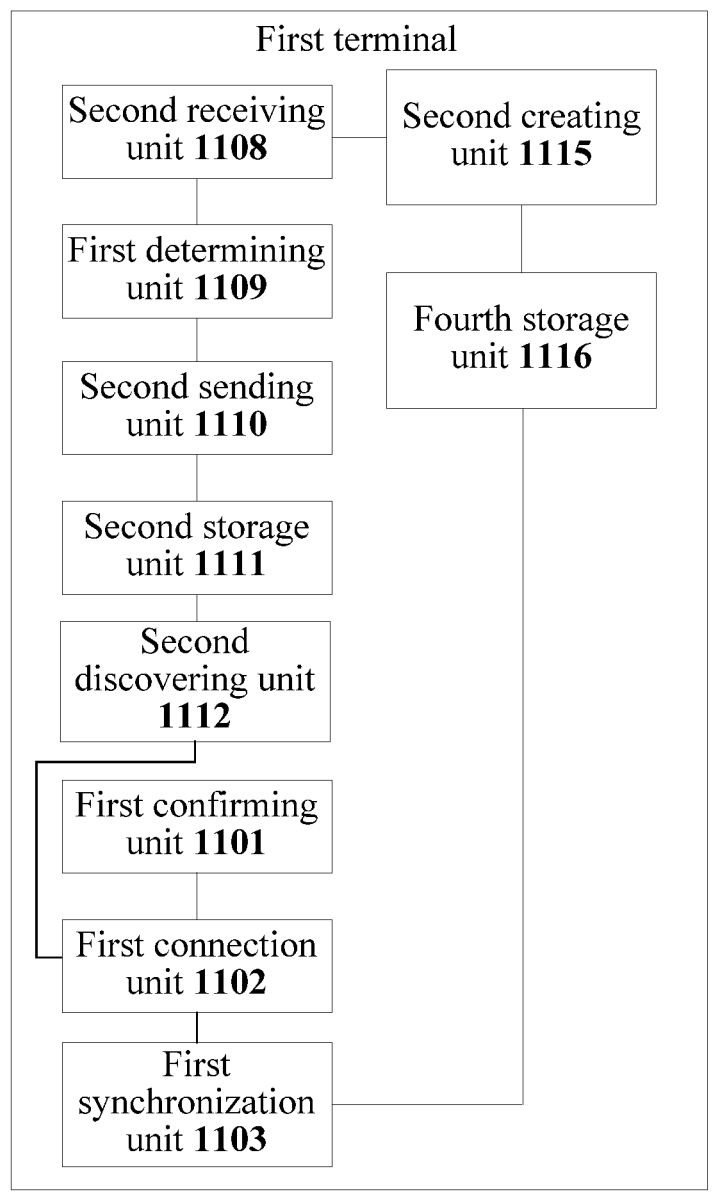
FIG. 15 is a schematic structural diagram 5 of a first terminal according to an embodiment of the present disclosure.

Optionally, during synchronization of the content for sharing between the first terminal and the second terminal, to make it convenient for the first terminal and the second terminal to acquire the content for sharing of each other, the terminals in the synchronization group each create a shared folder with a same name, and the shared folder may store the content for sharing. To reduce storage load of the terminals, the shared folder may store description information of the content for sharing only. If the first terminal serves as a noncreating terminal of the synchronization group, as shown in FIG. 15, the first terminal further includes a second creating unit 1115 and a fourth storage unit 1116.

The second receiving unit 1108 is configured to receive the synchronization group create message sent by the creating terminal, where the synchronization group create message carries the identifier of the first terminal, the identifier of the synchronization group, and a shared folder name, and the synchronization group create message is used for requesting the first terminal to join the synchronization group.

The second creating unit 1115 is configured to create a shared folder corresponding to the shared folder name.

The fourth storage unit 1116 is configured to store description information of the content for sharing in the shared folder.

The first synchronization unit 1103 is configured to acquire, using the connection established to the second terminal and according to the description information of the content for sharing stored in the shared folder of the first terminal and description information of the content for sharing stored in a shared folder of the second terminal, corresponding content for sharing, and synchronize the content for sharing with the second terminal.

Optionally, the first synchronization unit 1103 is configured to acquire description information, on a central node, of the content for sharing of the second terminal, where the central node belongs to the synchronization group; and acquire, according to the description information, on the central node, of the content for sharing of the second terminal and description information of the content for sharing of the first terminal, corresponding content for sharing, and synchronize the content for sharing with the second terminal.

Optionally, the first synchronization unit 1103 receives an update message sent by the second terminal, where the update message carries description information of updated content for sharing of the second terminal; and synchronize the updated content for sharing of the second terminal according to the description information of the updated content for sharing of the second terminal carried in the update message.

Optionally, the first terminal further includes at least one of the following units: a first authenticating unit and a first determining unit.

The first authenticating unit is configured to authenticate the second terminal.

The first determining unit is configured to determine whether a current moment falls within a preset synchronization period of time.

It should be noted that, for the description of the process in which the first terminal and the second terminal synchronize the content for sharing, refer to the description of the foregoing method embodiment, which is not described in detail herein again in this embodiment of the present disclosure.

This embodiment of the present disclosure provides a terminal. The terminal includes a first determining unit, a first connection unit, and a first synchronization unit, where the first determining unit determines content for sharing of the first terminal; when the first terminal discovers a second terminal, the first connection unit establishes a connection to the second terminal using a short-range wireless communications technology, where the second terminal belongs to a same synchronization group as the first terminal, and can establish a connection to the first terminal using a short-range wireless communications technology, and terminals that belong to a same synchronization group can synchronize content for sharing; and the first synchronization unit synchronizes the content for sharing of the first terminal and content for sharing of the second terminal using the connection established to the second terminal. Based on the foregoing solution, because terminals in a synchronization group are allowed to synchronize content for sharing among each other, after a terminal discovers a second terminal, the terminal establishes a connection to the second terminal using a short-range wireless communications technology, and content for sharing is synchronized between the terminal and the second terminal, so as to reduce operations of a user as much as possible and conveniently implement synchronization of the content for sharing among the terminals.

Figure 16:
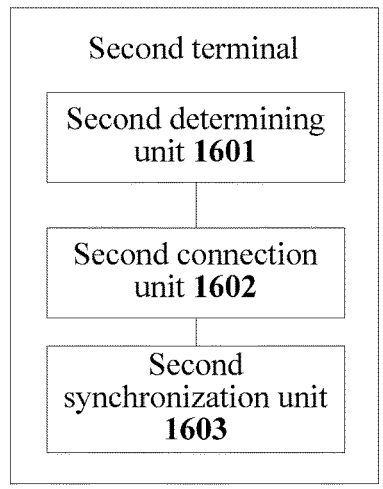
FIG. 16 is a schematic structural diagram 1 of a second terminal according to an embodiment of the present disclosure.

An embodiment of the present disclosure provides a second terminal. As shown in FIG. 16, the second terminal includes a second determining unit 1601, a second connection unit 1602, and a second synchronization unit 1603.

The second determining unit 1601 is configured to determine content for sharing of the second terminal.

The second connection unit 1602 is configured to, when the second terminal is discovered by a first terminal, establish a connection to the first terminal using a short-range wireless communications technology, where the second terminal belongs to a same synchronization group as the first terminal, and can establish a connection to the first terminal using a short-range wireless communications technology, and terminals that belong to a same synchronization group can synchronize content for sharing.

The second synchronization unit 1603 is configured to synchronize the content for sharing of the second terminal and content for sharing of the first terminal using the connection established to the first terminal.

Figure 17:
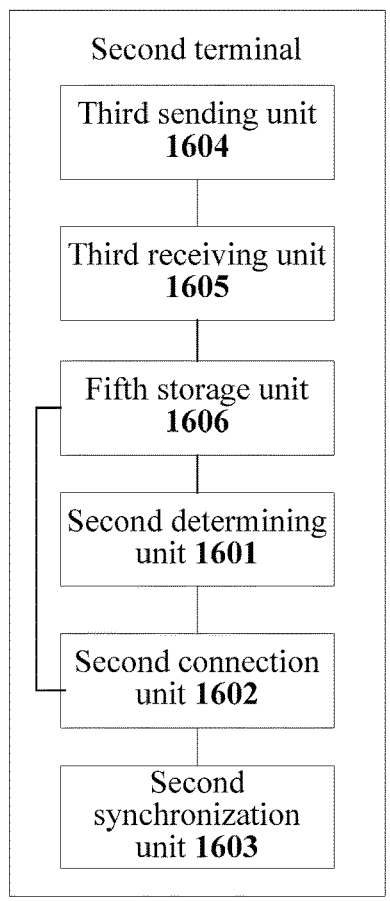
FIG. 17 is a schematic structural diagram 2 of a second terminal according to an embodiment of the present disclosure.

Optionally, as shown in FIG. 17, the second terminal further includes a third sending unit 1604, a third receiving unit 1605, and a fifth storage unit 1606.

The third sending unit 1604 is configured to send a synchronization group create message to the first terminal, where the synchronization group create message carries an identifier of the second terminal and an identifier of the synchronization group, and the synchronization group create message is used for requesting the first terminal to join the synchronization group.

The third receiving unit 1605 is configured to receive a synchronization group join message returned by the first terminal that agrees to join the synchronization group, where the synchronization group join message includes an identifier of the first terminal and the identifier of the synchronization group.

The fifth storage unit 1606 is configured to store the identifier of the first terminal in group member information.

The second connection unit 1602 is configured to establish the connection to the first terminal according to the identifier of the first terminal using the short-range wireless communications technology.

Figure 18:
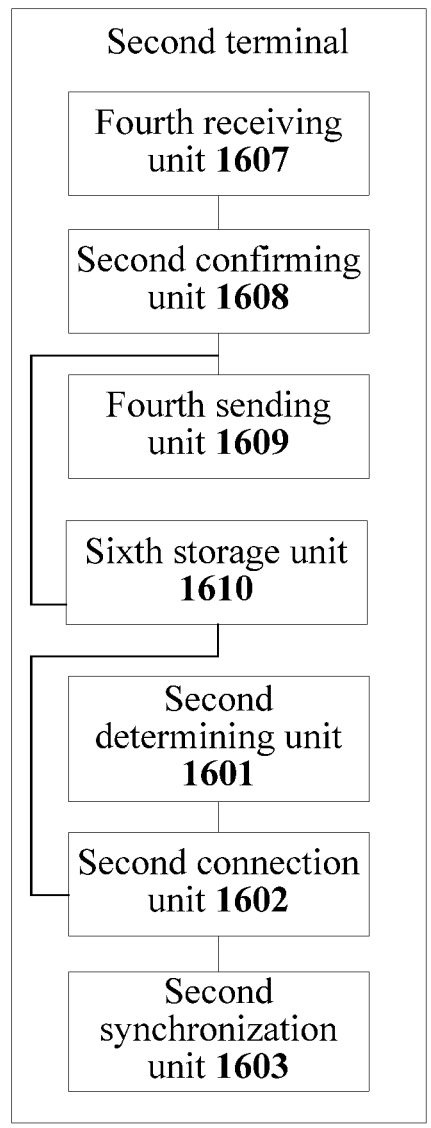
FIG. 18 is a schematic structural diagram 3 of a second terminal according to an embodiment of the present disclosure.

Optionally, as shown in FIG. 18, the second terminal further includes a fourth receiving unit 1607, a second confirming unit 1608, a fourth sending unit 1609, and a sixth storage unit 1610.

The fourth receiving unit 1607 is configured to receive a synchronization group create message sent by a creating terminal, where the synchronization group create message carries an identifier of the creating terminal and the identifier of the synchronization group, and the synchronization group create message is used for requesting the second terminal to join the synchronization group.

The second confirming unit 1608 is configured to agree to join the synchronization group.

The fourth sending unit 1609 is configured to send a synchronization group join message, where the synchronization group join message includes the identifier of the second terminal and the identifier of the synchronization group.

Figure 19:
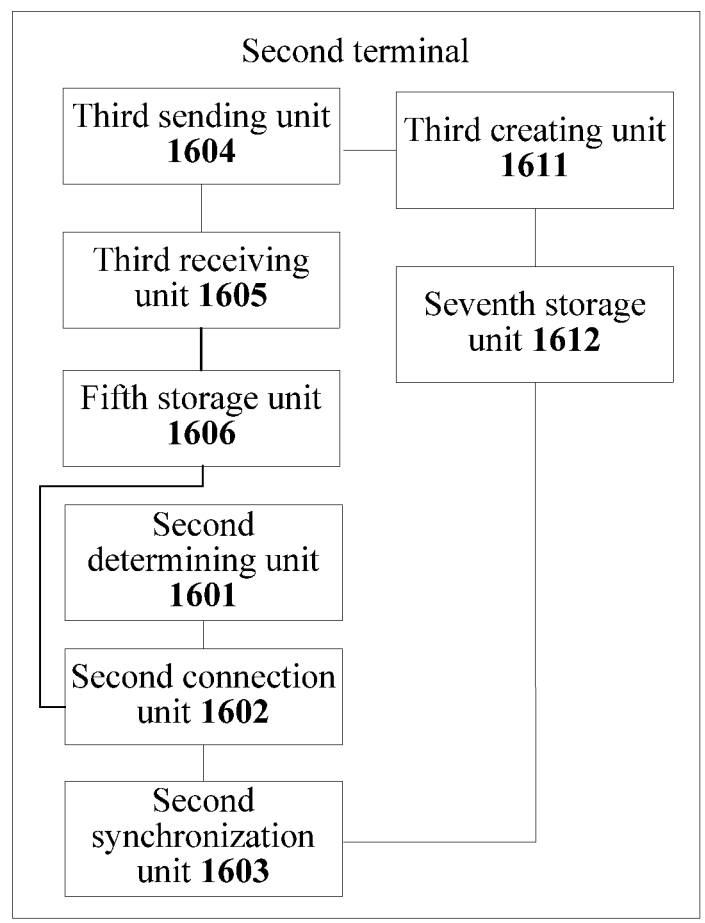
FIG. 19 is a schematic structural diagram 4 of a second terminal according to an embodiment of the present disclosure.

Optionally, during synchronization of the content for sharing between the first terminal and the second terminal, to make it convenient for the first terminal and the second terminal to acquire the content for sharing of each other, the terminals in the synchronization group each create a shared folder with a same name, and the shared folder may store the content for sharing. To reduce storage load of the terminals, the shared folder may store description information of the content for sharing only. If the second terminal serves as the creating terminal of the synchronization group, as shown in FIG. 19, the second terminal further includes a third creating unit 1611 and a seventh storage unit 1612.

The third sending unit 1604 is configured to send the synchronization group create message to the first terminal, where the synchronization group create message carries the identifier of the first terminal, the identifier of the synchronization group, and a shared folder name, and the synchronization group create message is used for requesting the first terminal to join the synchronization group.

The third creating unit 1611 is configured to create a shared folder corresponding to the shared folder name.

The seventh storage unit 1612 is configured to store description information of the content for sharing in the shared folder.

The second synchronization unit 1603 is configured to acquire, using the connection established to the first terminal and according to description information of the content for sharing stored in a shared folder of the first terminal and the description information of the content for sharing stored in the shared folder of the second terminal, corresponding content for sharing, and synchronize the content for sharing with the first terminal.

Figure 20:
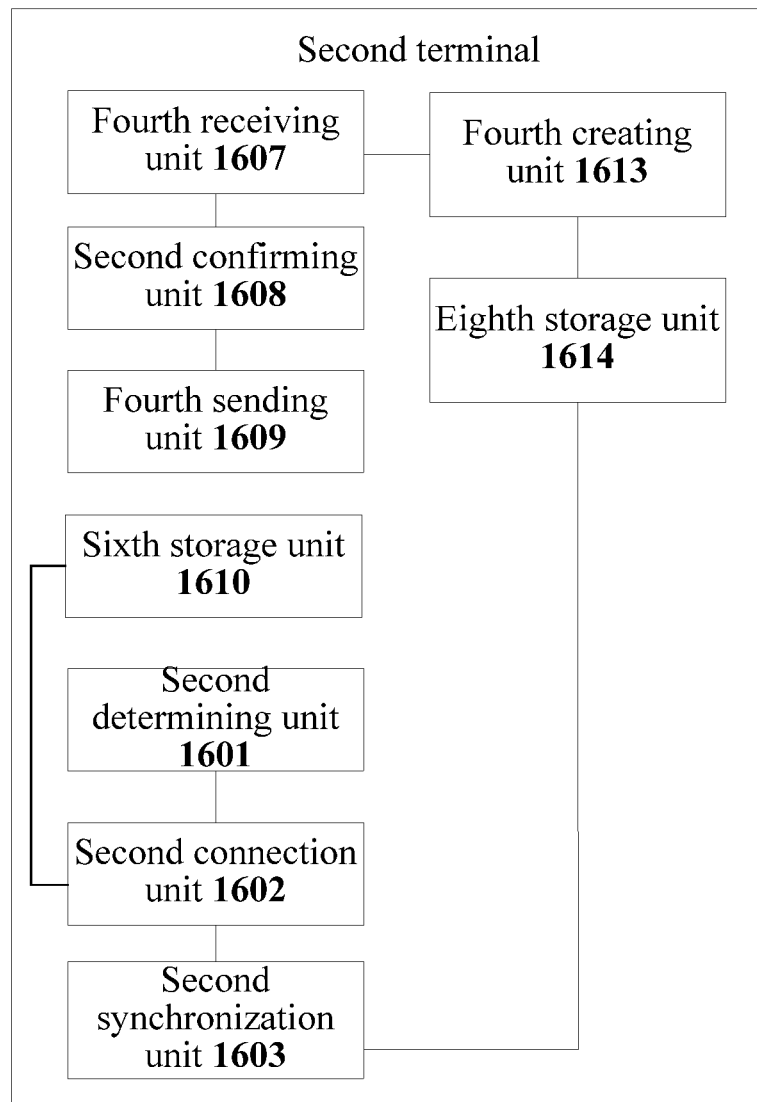
FIG. 20 is a schematic structural diagram 5 of a second terminal according to an embodiment of the present disclosure.

Optionally, during synchronization of the content for sharing between the first terminal and the second terminal, to make it convenient for the first terminal and the second terminal to acquire the content for sharing of each other, the terminals in the synchronization group each create a shared folder with a same name, and the shared folder may store the content for sharing. To reduce storage load of the terminals, the shared folder may store description information of the content for sharing only. If the second terminal serves as a noncreating terminal of the synchronization group, as shown in FIG. 20, the second terminal further includes a fourth creating unit 1613 and an eighth storage unit 1614.

The fourth receiving unit 1607 is configured to receive a synchronization group create message sent by a creating terminal, where the synchronization group create message carries an identifier of the creating terminal, the identifier of the synchronization group, and a shared folder name, and the synchronization group create message is used for requesting the second terminal to join the synchronization group.

The fourth creating unit 1613 is configured to create a shared folder corresponding to the shared folder name.

The eighth storage unit 1614 is configured to store description information of the content for sharing in the shared folder.

The second synchronization unit 1603 is configured to acquire, using the connection established to the first terminal and according to description information of the content for sharing stored in a shared folder of the first terminal and the description information of the content for sharing stored in the shared folder of the second terminal, corresponding content for sharing, and synchronize the content for sharing with the first terminal.

Optionally, the second synchronization unit 1603 is configured to acquire description information, on a central node, of the content for sharing of the first terminal, where the central node belongs to the synchronization group; and acquire, according to the description information, on the central node, of the content for sharing of the first terminal and description information of the content for sharing of the second terminal, corresponding content for sharing, and synchronize the content for sharing with the first terminal.

Optionally, the second synchronization unit 1603 is configured to receive, using the connection established to the second terminal, an update message sent by the second terminal, where the update message carries description information of updated content for sharing of the second terminal; and synchronize the updated content for sharing of the second terminal according to the description information of the updated content for sharing of the second terminal carried in the update message.

Optionally, the second terminal further includes at least one of the following units: a second authenticating unit and a second determining unit.

The second authenticating unit is configured to authenticate the second terminal.

The second determining unit is configured to determine whether a current moment falls within a preset synchronization period of time.

This embodiment of the present disclosure provides a second terminal. The second terminal includes a second determining unit, a second connection unit, and a second synchronization unit, where the second determining unit determines content for sharing of the second terminal; when the second terminal is discovered by a first terminal, the second connection unit establishes a connection to the first terminal using a short-range wireless communications technology, where the second terminal belongs to a same synchronization group as the first terminal, and can establish a connection to the first terminal using a short-range wireless communications technology, and terminals that belong to a same synchronization group can synchronize content for sharing; and the second synchronization unit synchronizes the content for sharing of the second terminal and content for sharing of the first terminal using the connection established to the first terminal. Based on the foregoing technical solution, because terminals in a synchronization group are allowed to synchronize content for sharing among each other, after a terminal discovers a second terminal, the terminal establishes a connection to the second terminal using a short-range wireless communications technology, and content for sharing is synchronized between the terminal and the second terminal, so as to reduce operations of a user as much as possible and conveniently implement synchronization of the content for sharing among the terminals.

Figure 21:
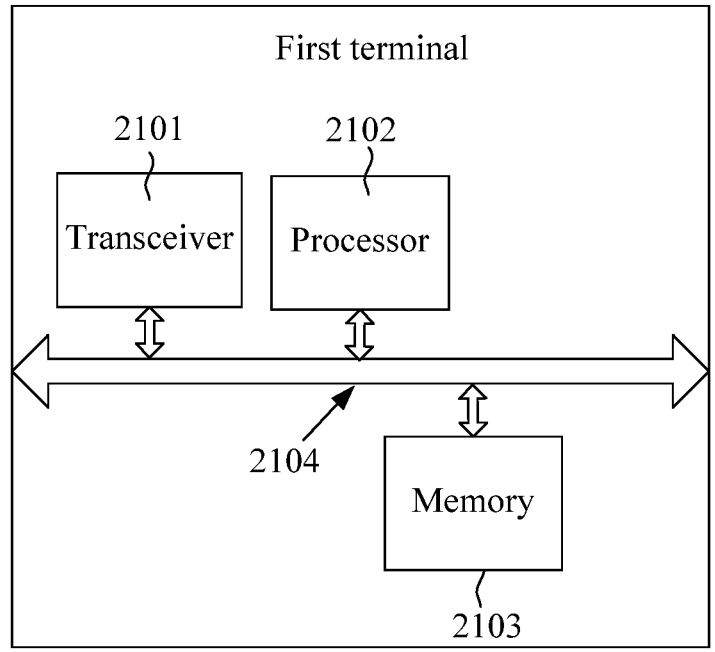
FIG. 21 is a schematic structural diagram 6 of a first terminal according to an embodiment of the present disclosure.

An embodiment of the present disclosure provides a terminal. As shown in FIG. 21, the terminal includes a transceiver 2101, a processor 2102, a memory 2103, and a first communications bus 2104 configured to implement a connection and communication among these apparatuses.

The first communications bus 2104 may be an Industry Standard Architecture (ISA) bus, a Peripheral Component Interconnect (PCI) bus, an Extended Industry Standard Architecture (EISA) bus or the like. The bus 2104 may be classified into an address bus, a data bus, a control bus, and the like. For ease of representation, the bus 2104 in FIG. 21 is represented only using one bold line, which does not mean that there is only one bus or one type of bus.

The memory 2103 is configured to store executable program code, where the program code includes a computer operation instruction. The memory 2103 may include a high-speed random access memory (RAM) memory, and may further include a non-volatile memory, for example, at least one disk memory.

The processor 2102 may be a central processing unit (CPU), or an application-specific integrated circuit (ASIC), or one or more integrated circuits configured to implement this embodiment of the present disclosure.

The processor 2102 is configured to execute the executable program code, for example, a computer program, stored in the memory 2103 to run a program corresponding to the executable code.

More specifically, the processor 2102 is configured to determine content for sharing of a first terminal and store the content for sharing of the first terminal in the memory 2103, and when the first terminal discovers a second terminal, invoke the transceiver 2101 to establish, using a short-range wireless communications technology, a connection to the second terminal, where the second terminal belongs to a same synchronization group as the first terminal, and can establish a connection to the first terminal using a short-range wireless communications technology, and terminals that belong to a same synchronization group can synchronize content for sharing.

The processor 2102 is further configured to invoke the transceiver 2101 to synchronize, using the connection established to the second terminal, the content for sharing of the first terminal and content for sharing of the second terminal.

Optionally, when the first terminal initiates creation of the synchronization group, the processor 2102 is further configured to invoke the transceiver 2101 to send a synchronization group create message to the second terminal, where the synchronization group create message carries an identifier of the first terminal and an identifier of the synchronization group, and the synchronization group create message is used for requesting the second terminal to join the synchronization group; and receive a synchronization group join message returned by the second terminal that agrees to join the synchronization group, where the synchronization group join message includes an identifier of the second terminal and the identifier of the synchronization group.

The processor 2102 is further configured to store, in the memory 2103, group member information including the identifier of the first terminal.

The processor 2102 is further configured to invoke the group member information in the memory 2103 and invoke the transceiver 2101 to discover the second terminal.

The processor 2102 is further configured to invoke the transceiver 2101 to establish, according to the identifier of the second terminal, using the short-range wireless communications technology, the connection to the second terminal.

Optionally, when the first terminal serves as a noncreating terminal of the synchronization group, the processor 2102 is further configured to invoke the transceiver 2101 to receive a synchronization group create message sent by a creating terminal, where the synchronization group create message carries an identifier of the creating terminal and an identifier of the synchronization group, and the synchronization group create message is used for requesting the second terminal to join the synchronization group.

The processor 2102 is further configured to agree to join the synchronization group.

The processor 2102 is further configured to invoke the transceiver 2101 to send a synchronization group join message, where the synchronization group join message includes an identifier of the first terminal and the identifier of the synchronization group.

The processor 2102 is further configured to store, in the memory 2103, group member information including the identifier of the creating terminal.

The processor 2102 is further configured to invoke the group member information in the memory 2103 and invoke the transceiver 2101 to discover the second terminal.

The processor 2102 is further configured to invoke the transceiver 2101 to establish, according to the identifier of the second terminal, using the short-range wireless communications technology, the connection to the second terminal.

Optionally, when the synchronization group includes multiple terminals, the processor 2102 is further configured to invoke the transceiver 2101 to receive a synchronization group join message sent by a third terminal that agrees to join the synchronization group, where the synchronization group join message sent by the third terminal includes an identifier of the third terminal and the identifier of the synchronization group.

The processor 2102 is further configured to store, in the memory 2103, group member information including the identifier of the third terminal.

Optionally, if the first terminal and the second terminal are located in a same WLAN, the processor 2102 is configured to invoke the transceiver 2101 to send the synchronization group create message to the second terminal in a multicast manner in the local area network; and receive the synchronization group join message multicasted in the local area network by the second terminal that agrees to join the synchronization group.

Optionally, if the first terminal and the second terminal are not located in a same WLAN, the processor 2102 is configured to invoke the transceiver 2101 to send the synchronization group create message to a message server, such that the message server forwards the synchronization group create message to the second terminal; and receive the synchronization group join message that is sent by the second terminal that agrees to join the synchronization group and is forwarded by the message server.

Optionally, during synchronization of the content for sharing between the first terminal and the second terminal, to make it convenient for the first terminal and the second terminal to acquire the content for sharing of each other, the terminals in the synchronization group each create a shared folder with a same name, and the shared folder may store the content for sharing. To reduce storage load of the terminals, the shared folder may store description information of the content for sharing only. If the first terminal serves as the creating terminal of the synchronization group, the processor 2102 is configured to invoke the transceiver 2101 to send the synchronization group create message to the second terminal, where the synchronization group create message carries the identifier of the first terminal, the identifier of the synchronization group, and a shared folder name, and the synchronization group create message is used for requesting the second terminal to join the synchronization group.

The processor 2102 is further configured to create, in the memory 2103, a shared folder corresponding to the shared folder name, and store description information of the content for sharing in the shared folder.

The processor 2102 is further configured to invoke the transceiver 2101 and the connection established to the second terminal to synchronize, according to the description information of the content for sharing stored in the shared folder of the first terminal and description information of the content for sharing stored in a shared folder of the second terminal, the content for sharing with the second terminal.

Optionally, during synchronization of the content for sharing between the first terminal and the second terminal, to make it convenient for the first terminal and the second terminal to acquire the content for sharing of each other, the terminals in the synchronization group each create a shared folder with a same name, and the shared folder may store the content for sharing. To reduce storage load of the terminals, the shared folder may store description information of the content for sharing only. If the first terminal serves as a noncreating terminal of the synchronization group, the processor 2102 is further configured to invoke the transceiver 2101 to receive a synchronization group create message sent by the creating terminal, where the synchronization group create message carries the identifier of the creating terminal, the identifier of the synchronization group, and a shared folder name, and the synchronization group create message is used for requesting the first terminal to join the synchronization group.

The processor 2102 is further configured to create, in the memory 2103, a shared folder corresponding to the shared folder name, and store description information of the content for sharing in the shared folder.

The processor 2102 is further configured to invoke the transceiver 2101 and the connection established to the second terminal to synchronize, according to the description information of the content for sharing stored in the shared folder of the first terminal and description information of the content for sharing stored in a shared folder of the second terminal, the content for sharing with the second terminal.

Optionally, the processor 2102 is configured to invoke the transceiver 2101 to acquire description information, on a central node, of the content for sharing of the second terminal, where the central node belongs to the synchronization group; and synchronize the content for sharing of the second terminal according to the description information, on the central node, of the content for sharing of the second terminal.

Optionally, the processor 2102 may invoke the transceiver 2101 to receive an update message sent by the second terminal, where the update message carries description information of the content for sharing of the second terminal; and synchronize the content for sharing of the second terminal according to the description information of the content for sharing of the second terminal carried in the update message.

Optionally, before the first terminal synchronizes the content for sharing with the second terminal, the processor 2102 is further configured to perform at least one of the following: authenticating the second terminal; and determining whether a current moment falls within a preset synchronization period of time.

This embodiment of the present disclosure provides a first terminal. The first terminal includes a processor, a memory, and a transceiver, where the processor determines content for sharing of the first terminal, and when the first terminal discovers a second terminal, invokes the transceiver to establish, using a short-range wireless communications technology, a connection to the second terminal, where the second terminal belongs to a same synchronization group as the first terminal, and can establish a connection to the first terminal using a short-range wireless communications technology, and terminals that belong to a same synchronization group can synchronize content for sharing; and the processor further invokes the transceiver to synchronize, using the connection established to the second terminal, the content for sharing of the first terminal and content for sharing of the second terminal. Based on the foregoing technical solution, because terminals in a synchronization group are allowed to synchronize content for sharing among each other, after a terminal discovers a second terminal, the terminal establishes a connection to the second terminal using a short-range wireless communications technology, and content for sharing is synchronized between the terminal and the second terminal, so as to reduce manual operations and automatically synchronize the content for sharing with the second terminal.

Figure 22:
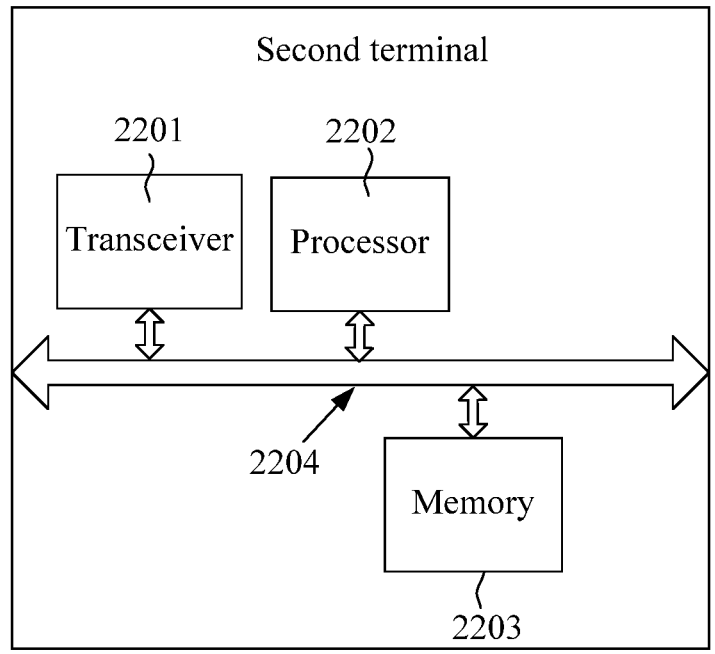
FIG. 22 is a schematic structural diagram 6 of a second terminal according to an embodiment of the present disclosure.

An embodiment of the present disclosure provides a second terminal. As shown in FIG. 22, the second terminal includes a transceiver 2201, a processor 2202, a memory 2203, and a first communications bus 2204 configured to implement a connection and communication among these apparatuses.

The first communications bus 2204 may be an ISA bus, a PCI bus, an EISA bus or the like. The bus 2204 may be classified into an address bus, a data bus, a control bus, and the like. For ease of representation, the bus 2204 in FIG. 22 is represented only using one bold line, which does not mean that there is only one bus or one type of bus.

The memory 2203 is configured to store executable program code, where the program code includes a computer operation instruction. The memory 2203 may include a high-speed RAM memory, and may further include a non-volatile memory, for example, at least one disk memory.

The processor 2202 may be a CPU, or an ASIC, or one or more integrated circuits configured to implement this embodiment of the present disclosure.

The processor 2202 is configured to execute the executable program code, for example, a computer program, stored in the memory 2203 to run a program corresponding to the executable code.

More specifically, the processor 2202 is configured to determine content for sharing of the second terminal and store the content for sharing of the second terminal in the memory 2203.

The processor 2202 is further configured to, when the second terminal is discovered by a first terminal, invoke the transceiver 2201 to establish, using a short-range wireless communications technology, a connection to the first terminal, where the second terminal belongs to a same synchronization group as the first terminal, and can establish a connection to the first terminal using a short-range wireless communications technology, and terminals that belong to a same synchronization group can synchronize content for sharing.

The processor 2202 is further configured to invoke the transceiver 2201 and the connection established to the first terminal to synchronize the content for sharing of the second terminal and content for sharing of the first terminal.

Optionally, when the second terminal initiates creation of the synchronization group, the processor 2202 is further configured to invoke the transceiver 2201 to send a synchronization group create message to a first terminal, where the synchronization group create message carries an identifier of the second terminal and an identifier of the synchronization group, and the synchronization group create message is used for requesting the first terminal to join the synchronization group; and receive a synchronization group join message returned by the first terminal that agrees to join the synchronization group, where the synchronization group join message includes an identifier of the first terminal that agrees to join the synchronization group and the identifier of the synchronization group.

The processor 2202 is further configured to store, in the memory 2203, group member information including the identifier of the first terminal.

The processor 2202 is further configured to invoke the transceiver 2201 to establish, according to the identifier of the first terminal, using a short-range wireless communications technology, the connection to the first terminal.

Optionally, when the second terminal serves as a noncreating terminal of the synchronization group, the processor 2202 is further configured to invoke the transceiver 2201 to receive a synchronization group create message sent by a creating terminal, where the synchronization group create message carries an identifier of the creating terminal and an identifier of the synchronization group, and the synchronization group create message is used for requesting the second terminal to join the synchronization group.

The processor 2202 is further configured to agree to join the synchronization group.

The processor 2202 is further configured to invoke the transceiver 2201 to send a synchronization group join message, where the synchronization group join message includes an identifier of the second terminal and the identifier of the synchronization group.

The processor 2202 is further configured to store, in the memory 2203, group member information including the identifier of the creating terminal.

Optionally, during synchronization of the content for sharing between the first terminal and the second terminal, to make it convenient for the first terminal and the second terminal to acquire the content for sharing of each other, the terminals in the synchronization group each create a shared folder with a same name, and the shared folder may store the content for sharing. To reduce storage load of the terminals, the shared folder may store description information of the content for sharing only. If the second terminal serves as the creating terminal of the synchronization group, the processor 2202 is configured to invoke the transceiver 2201 to send the synchronization group create message to the first terminal, where the synchronization group create message carries an identifier of the second terminal, the identifier of the synchronization group, and a shared folder name, and the synchronization group create message is used for requesting the first terminal to join the synchronization group.

The processor 2202 is further configured to create, in the memory 2203, a shared folder corresponding to the shared folder name, and store description information of the content for sharing in the shared folder.

The processor 2202 is further configured to invoke the transceiver 2201, the connection established to the first terminal, and the memory 2203 to synchronize, according to the description information of the content for sharing stored in the shared folder of the second terminal and description information of the content for sharing stored in a shared folder of the first terminal, the content for sharing with the first terminal.

Optionally, during synchronization of the content for sharing between the first terminal and the second terminal, to make it convenient for the first terminal and the second terminal to acquire the content for sharing of each other, the terminals in the synchronization group each create a shared folder with a same name, and the shared folder may store the content for sharing. To reduce storage load of the terminals, the shared folder may store description information of the content for sharing only. If the second terminal serves as a noncreating terminal of the synchronization group, the processor 2202 is configured to invoke the transceiver 2201 to receive the synchronization group create message sent by the creating terminal, where the synchronization group create message carries the identifier of the creating terminal, the identifier of the synchronization group, and a shared folder name, and the synchronization group create message is used for requesting the second terminal to join the synchronization group.

The processor 2202 is further configured to create, in the memory 2203, a shared folder corresponding to the shared folder name, and store description information of the content for sharing in the shared folder.

The processor 2202 is further configured to invoke the transceiver 2201 and the connection established to the first terminal and invoke the memory 2203 to synchronize, according to the description information of the content for sharing stored in the shared folder of the second terminal and description information of the content for sharing stored in a shared folder of the first terminal, the content for sharing with the first terminal.

Optionally, the processor 2202 is configured to invoke the transceiver 2201 to acquire description information, on a central node, of the content for sharing of the first terminal, where the central node belongs to the synchronization group; and synchronize the content for sharing of the first terminal according to the description information, on the central node, of the content for sharing of the first terminal.

Optionally, the processor 2202 is configured to receive, by the first terminal, using the connection established to the second terminal, an update message sent by the second terminal, where the update message carries description information of the content for sharing of the second terminal; and synchronize the content for sharing of the first terminal according to the description information of the content for sharing of the first terminal carried in the update message.

Optionally, before the first terminal synchronizes the content for sharing with the second terminal, the processor 2202 is further configured to perform at least one of the following: authenticating the first terminal; and determining whether a current moment falls within a preset synchronization period of time.

This embodiment of the present disclosure provides a second terminal. The second terminal includes a processor, a memory, and a transceiver, where the processor determines content for sharing of the second terminal and stores the content for sharing of the second terminal in the memory; the processor is further configured to, when the second terminal is discovered by a first terminal, invoke the transceiver to establish, using a short-range wireless communications technology, a connection to the first terminal, where the second terminal belongs to a same synchronization group as the first terminal, and can establish a connection to the first terminal using a short-range wireless communications technology, and terminals that belong to a same synchronization group can synchronize content for sharing; and the processor further invokes the transceiver and the connection established to the first terminal to synchronize the content for sharing of the second terminal and content for sharing of the first terminal. Based on the foregoing technical solution, because terminals in a synchronization group are allowed to synchronize content for sharing among each other, after a terminal discovers a second terminal, the terminal establishes a connection to the second terminal using a short-range wireless communications technology, and content for sharing is synchronized between the terminal and the second terminal, so as to reduce operations of a user as much as possible and conveniently implement synchronization of the content for sharing among the terminals.

It may be clearly understood by persons skilled in the art that, for the purpose of convenient and brief description, for a detailed working process of the foregoing terminal and unit, refer to a corresponding process in the foregoing method embodiments, and details are not described herein again.

In the several embodiments provided by this application, it should be understood that the disclosed terminal and method may be implemented in other manners. For example, the described terminal embodiment is merely exemplary. For example, the unit division is merely logical function division and may be other division in actual implementation. For example, multiple units or members may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform some of the steps of the methods described in the embodiments of the present disclosure. The foregoing storage medium includes any medium that can store program code, such as a universal serial bus (USB) flash drive, a removable hard disk, a read-only memory (ROM), a RAM, a magnetic disk, or an optical disc.

Finally, it should be noted that the foregoing embodiments are merely intended for describing the technical solutions of the present disclosure rather than limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, as long as such modifications or replacements do not cause the essence of corresponding technical solutions of depart from the spirit and scope of the technical solutions of the embodiments of the present disclosure.

The foregoing descriptions are merely implementation manners of the present disclosure, but are not intended to limit the protection scope of the present disclosure. Any variation or replacement readily figured out by persons skilled in the art within the technical scope disclosed in the present disclosure shall fall within the protection scope of the present disclosure. Therefore, the protection scope of the present disclosure shall be subject to the protection scope of the claims.

What is claimed is:

1. A method for synchronizing content, comprising:
    determining, by a first terminal, first terminal sharing content;
    sending, by the first terminal, a synchronization group create message to a second terminal, the first terminal and the second terminal being in a same user group created on an instant messaging application, the synchronization group create message carrying a first terminal identifier and a synchronization group identifier, the synchronization group create message being used for requesting that the second terminal join a synchronization group, and the first terminal sending the synchronization group create message to the second terminal comprising multicasting, by the first terminal, the synchronization group create message to the second terminal in a local area network;
    receiving, by the first terminal, a synchronization group join message from the second terminal, the synchronization group join message indicating that the second terminal has agreed to join the synchronization group, the synchronization group join message comprising a second terminal identifier and the synchronization group identifier, the synchronization group being a group in which the first terminal is allowed to automatically synchronize with the second terminal, and the first terminal receiving the synchronization group join message from the second terminal comprising receiving, by the first terminal, the synchronization group join message multicasted in the local area network from the second terminal;
    storing, by the first terminal, the second terminal identifier in a group member information;
    subsequently discovering, by the first terminal, the second terminal according to the group member information;
    establishing, by the first terminal when the first terminal determines that the second terminal belongs to the same synchronization group as the first terminal, a connection to the second terminal according to the second terminal identifier and using a short-range wireless communications technology; and
    synchronizing, by the first terminal, the first terminal sharing content and second terminal sharing content.

2. The method of claim 1, wherein sending, by the first terminal, the synchronization group create message to the second terminal comprises sending, by the first terminal, the synchronization group create message to a message server, and receiving, by the first terminal, the synchronization group join message from the second terminal comprises receiving, by the first terminal, the synchronization group join message from the second terminal via the message server.

3. The method of claim 1, wherein the synchronization group create message further carries a shared folder name, and before discovering the second terminal, the method further comprises:
    creating, by the first terminal, a first terminal shared folder corresponding to the shared folder name; and
    storing, by the first terminal, first terminal sharing content description information in the first terminal shared folder, and
    wherein synchronizing, by the first terminal, the first terminal sharing content and second terminal sharing content comprises:

acquiring, by the first terminal, corresponding sharing content using the connection and according to the first terminal sharing content description information stored in the first terminal shared folder and second terminal sharing content description information stored in a second terminal shared folder; and synchronizing the corresponding sharing content with the second terminal.

4. The method of claim 1, wherein before synchronizing, by the first terminal, the first terminal sharing content and second terminal sharing content, the method further comprises:

authenticating, by the first terminal, the second terminal; and succeeding in the authentication.

5. The method of claim 1, wherein before the synchronizing, by the first terminal, the first terminal sharing content and second terminal sharing content, the method further comprises determining, by the first terminal, that a current moment falls within a preset synchronization period of time.

6. The method of claim 1, wherein synchronizing, by the first terminal, the first terminal sharing content and the second terminal sharing content comprises:

establishing, by a central node, a first TCP connection to the first terminal and a second TCP connection to the second terminal, the central node belonging to the synchronization group;

acquiring, by the central node, a first terminal sharing content directory and a second terminal sharing content directory using a Browse or a Search action in a universal plug and play (UPnP) content directory service (CDS);

determining, by the central node according to the first terminal sharing content directory and the second terminal sharing content directory, that the first terminal sharing content and the second terminal sharing content have been downloaded locally by comparing name information with that of locally saved content; and synchronizing, by the first terminal, the first terminal sharing content and second terminal sharing content using the central node.

7. A first terminal, comprising:

a transceiver, a memory configured to store executable program code; and a processor coupled to the transceiver and the memory and configured to execute the executable program code to run a program corresponding to the executable program code, which causes the processor to be configured to:

determine first terminal sharing content;

send, via the transceiver, a synchronization group create message to a second terminal, the first terminal and the second terminal being in a same user group created on an instant messaging application, the synchronization group create message carrying a first terminal identifier and a synchronization group identifier, and the synchronization group create message being used for requesting that the second terminal join a synchronization group;

receive, via the transceiver, a synchronization group join message from the second terminal, the synchronization group join message indicating that the second terminal has agreed to join the synchronization group, the synchronization group join message comprising a second terminal identifier and the synchronization group identifier, and the synchronization group being a group in which the first terminal is allowed to automatically synchronize with the second terminal;

store the second terminal identifier in a group member information;

subsequently discover the second terminal according to the group member information;

establish, using the transceiver and a short-range wireless communications technology, a connection to the second terminal according to the second terminal identifier when the first terminal determines that the second terminal belongs to the same synchronization group as the first terminal;

synchronize, using the transceiver and the connection, the first terminal sharing content and second terminal sharing content; and multicast, using the transceiver, the synchronization group create message to the second terminal in a local area network; and receive, using the transceiver, the synchronization group join message multicasted in the local area network from the second terminal.

8. The first terminal of claim 7, wherein the processor is further configured to use the transceiver to:

send the synchronization group create message to a message server; and receive the synchronization group join message from the second terminal via the message server.

9. The first terminal of claim 7, wherein the synchronization group create message further carries a shared folder name, and the processor is further configured to:

create a first terminal shared folder corresponding to the shared folder name;

use the memory to store first terminal sharing content description information in the first terminal shared folder;

acquire, via the transceiver, corresponding sharing content using the connection and according to the first terminal sharing content description information stored in the first terminal shared folder and second terminal sharing content description information stored in a second terminal shared folder; and synchronize, via the transceiver, the corresponding sharing content with the second terminal.

10. The first terminal of claim 7, wherein the processor is further configured to authenticate the second terminal.

11. The first terminal of claim 7, wherein the processor is further configured to determine whether a current moment falls within a preset synchronization period of time before synchronizing the first terminal sharing content and the second terminal sharing content.

* * * * *